(12) United States Patent
Brown

(10) Patent No.: US 11,603,151 B2
(45) Date of Patent: Mar. 14, 2023

(54) DOOR LIFT, STORAGE AND RE-INSTALLATION SYSTEM

(71) Applicant: James Stephen Brown, Saint Amant, LA (US)

(72) Inventor: James Stephen Brown, Saint Amant, LA (US)

(*) Notice: Subject to any disclaimer, the term of this patent is extended or adjusted under 35 U.S.C. 154(b) by 782 days.

(21) Appl. No.: 16/691,668

(22) Filed: Nov. 22, 2019

(65) Prior Publication Data

US 2021/0155304 A1 May 27, 2021

(51) Int. Cl.
*B62D 65/06* (2006.01)
*B65G 1/02* (2006.01)
*E05D 7/10* (2006.01)

(52) U.S. Cl.
CPC ............. *B62D 65/06* (2013.01); *B65G 1/026* (2013.01); *B65G 2201/0294* (2013.01); *B65G 2207/40* (2013.01); *E05D 7/1044* (2013.01); *E05Y 2900/531* (2013.01)

(58) Field of Classification Search
CPC ... B05B 13/0285; B25H 1/0007; B62B 1/268; B62B 3/108; B62D 65/02; B62D 65/022; B62D 65/024; B62D 65/026; B62D 65/028; B62D 65/06; B65G 1/026; B65G 2201/0294; B65G 2207/40; B66C 23/48; B66C 23/485; B66F 3/08; B66F 5/00; B66F 5/02; B66F 5/025; B66F 7/00; B66F 7/26; B66F 9/06; C10B 25/14; E04F 21/0023; E04F 21/18; E04F 21/1805; E04F 21/1894; E05D 7/1044; E05Y 2900/531

USPC ........ 206/448, 454; 211/41.14, 41.15, 41.16; 269/17, 905; 29/281.5; 414/11
See application file for complete search history.

(56) References Cited

U.S. PATENT DOCUMENTS

| 1,330,891 | A | * | 2/1920 | Edward | B62B 3/108 280/79.7 |
| 2,799,920 | A | * | 7/1957 | Hansen | B21D 1/12 269/221 |
| 4,180,252 | A | * | 12/1979 | Cushenbery | B23Q 1/5468 254/9 B |

(Continued)

FOREIGN PATENT DOCUMENTS

EP 3064418 A1 * 9/2016 ........... B62D 65/022

*Primary Examiner* — Joshua E Rodden

(57) ABSTRACT

A system for removing, storing and precisely re-installing removable automobile doors. This system includes a mobile base for positioning near the vehicle and moving stored doors to their storage location. The base of this system provides mounting positions for 2 or more lifting/storing/re-installation devices, accommodating full service (removal, storage and re-installation) of up to 4 doors at once. The lifting/storage/re-installation devices contain full 3 axis precise adjustment and rigid coupling to each of the vehicle's doors. Without this precision, the weight and non-balance of removing/re-installing the doors can cause the door to tilt into or away from the vehicle, possibly crushing a human body part (finger, hand) and/or damaging the vehicle or door. By rigidly coupling the door to the precisely adjusted device, precise vertical lifting and lowering may be used to remove and re-install the doors, including accommodating surface variations encountered from removal to re-installation time.

19 Claims, 43 Drawing Sheets

(56) References Cited

U.S. PATENT DOCUMENTS

| | | | | |
|---|---|---|---|---|
| 4,183,511 | A * | 1/1980 | Marek | B66C 23/48 269/71 |
| 4,932,639 | A * | 6/1990 | Fjellstrom | B66F 3/08 269/71 |
| 5,009,406 | A * | 4/1991 | McDermott | B25H 1/0007 269/17 |
| 6,024,348 | A * | 2/2000 | Ventura | B05B 13/0285 269/104 |
| 7,008,165 | B1 * | 3/2006 | Grimes | B66F 9/06 414/800 |
| 7,008,166 | B1 * | 3/2006 | Grimes | B66C 23/48 254/114 |
| 7,243,904 | B1 | 7/2007 | Grimes | |
| 8,109,526 | B2 * | 2/2012 | Mason | B62B 3/02 280/47.35 |
| 8,770,561 | B2 * | 7/2014 | Gagnon, Jr. | B25B 11/00 118/500 |
| 10,160,627 | B1 * | 12/2018 | Robertson | B62B 5/06 |
| 10,744,526 | B2 * | 8/2020 | Johnson | B25H 1/00 |
| 11,518,459 | B2 * | 12/2022 | Hall | B62D 65/026 |
| 2007/0022950 | A1 * | 2/2007 | Livingston | B05B 13/0285 248/128 |
| 2008/0150244 | A1 * | 6/2008 | Carlei | B65G 49/061 414/572 |
| 2021/0229720 | A1 * | 7/2021 | Burns | B62B 5/00 |

* cited by examiner

DOOR LIFT, STORAGE AND RE-INSTALLATION SYSTEM

BACKGROUND OF THE INVENTION

In addition to being heavy, awkward and lacking lifting points (easily, for human hands), removing doors from vehicles so equipped, still presents a challenge for those who want to enjoy the option of door-free use of their vehicle. These challenges include safe storage and the ability to remove and re-install the doors free of harm: both to the user and the vehicle. These challenges often discourage the user from enjoying the door-free benefit. It is simply too hard, to physically remove the doors. Then if stored on a rack in a garage, the same physical challenge is required to hang the doors, followed by the reverse of this procedure to re-install the doors back onto the vehicle. Then you have those who are capable of removing and re-installing the doors by hand yet have nowhere to store the doors. As a result, they are leaned up against something (wall, box, etc.) with the painted, lower edge on the ground. Even if gently placed, a painted door edge on any hard surface, adds risk to scratching, chipping the paint off the lower door edge; worse if the door is slightly dropped onto the floor surface.

Damage may also occur removing the doors if the user fails to lift the door at a balanced point. As soon as the door's hinge pins are free from the vehicle's hinge pin mounts, if the door is unbalanced in the user's hand, the weight of the door can cause it to tilt, possibly causing the door to crash into the vehicle, damaging it (chipping/denting painted surfaces or damaging the hinge pin/hinge), or worse injuring the user (hand or finger getting crushed by the tilt of the heavy door). This damage can occur whether lifting the door completely by hand or using some homemade lift carts that don't allow the user to properly align and secure the lifting surface to the tilt/angle of the door as it rests on the vehicle, after being parked on an unknown possibly, irregular surface.

BRIEF SUMMARY

In some embodiments, the present disclosure provides a system to lift, remove, store and precisely re-install doors from/to a vehicle. Certain embodiments of the present disclosure comprise: a) a mobile base, with a low center of gravity for stability (to reduce the chances of tipping over), for positioning the device near the vehicle and to its storage location; b) lifting/lowering systems to lift, store and re-install up to 4 doors; c) each lifting system comprised of 3 axis adjustment; d) rigid coupling of the door to the lifting device, strapping each door to paint protected rests (felt padded); e) the combination of the 3 axis adjustment and rigid coupling to the door makes removal and re-installation of the doors precise, requiring minimal physical exertion from the user; f) 3 axis adjustment is accommodated using hand cranked actuated jack screws and sliding mechanisms on each axis; g) all 3 axes are initially used to precisely align the lifting device to the door's current position (tilt, with respect to the vehicle's parking position and the pavement angle relative to the pavement under the device); h) once precisely aligned, the door is securely coupled to the device using straps; i) once securely coupled (attached with straps) to the device, the door is lifted off of the vehicles receiving hinge mounts using the device's vertical most axis jack screw, via a crank handle, by the user; j) once a door has been lifted, the device is moved to the next door to repeat the process, until all required doors are removed; k) once all required doors are lifted, they can easily be moved on the base's large wheels to a safe storage location, with the delicate painted surfaces facing inward, reducing the possibility of damage from external objects that they make come in contact with; l) the device may now be moved to its final storage location; m) should that final location be outdoors, an optional, weather-proof cover can protect the doors from the elements; n) should that final location by indoors the device is narrow enough to fit through standard exterior doors, with all doors attached/stored; o) large wheels are used to accommodate non-paved surfaces, such as grass, gravel, dirt, etc.

BRIEF DESCRIPTION OF THE DRAWINGS

FIG. 35 illustrates a view of the aligned hinge pins after adjusting the tilt of the door using the adjustment knob on the present disclosure.

DETAILED DESCRIPTION

With reference to FIGS. 1-44, the present disclosure provides a vehicle door storage system 100 for safely removing, storing and re-installing doors from a vehicle equipped with removeable doors. A 2-door version of system 100 is indicated by the numeral 16 (e.g., FIG. 7). A 4-door version of system 100 is indicated by the numeral 17 (e.g., FIG. 9). For clarity, reference numbers are not included for all drawings where not needed for explanation.

For the purposes of this document, the vehicles referenced are left hand driven (LHD). This is the common configuration recognized in the United States and other countries. Therefore, the driver's side doors are located on the left side of the vehicle. The passenger's side doors are located on the right side of the vehicle.

Figure 1:
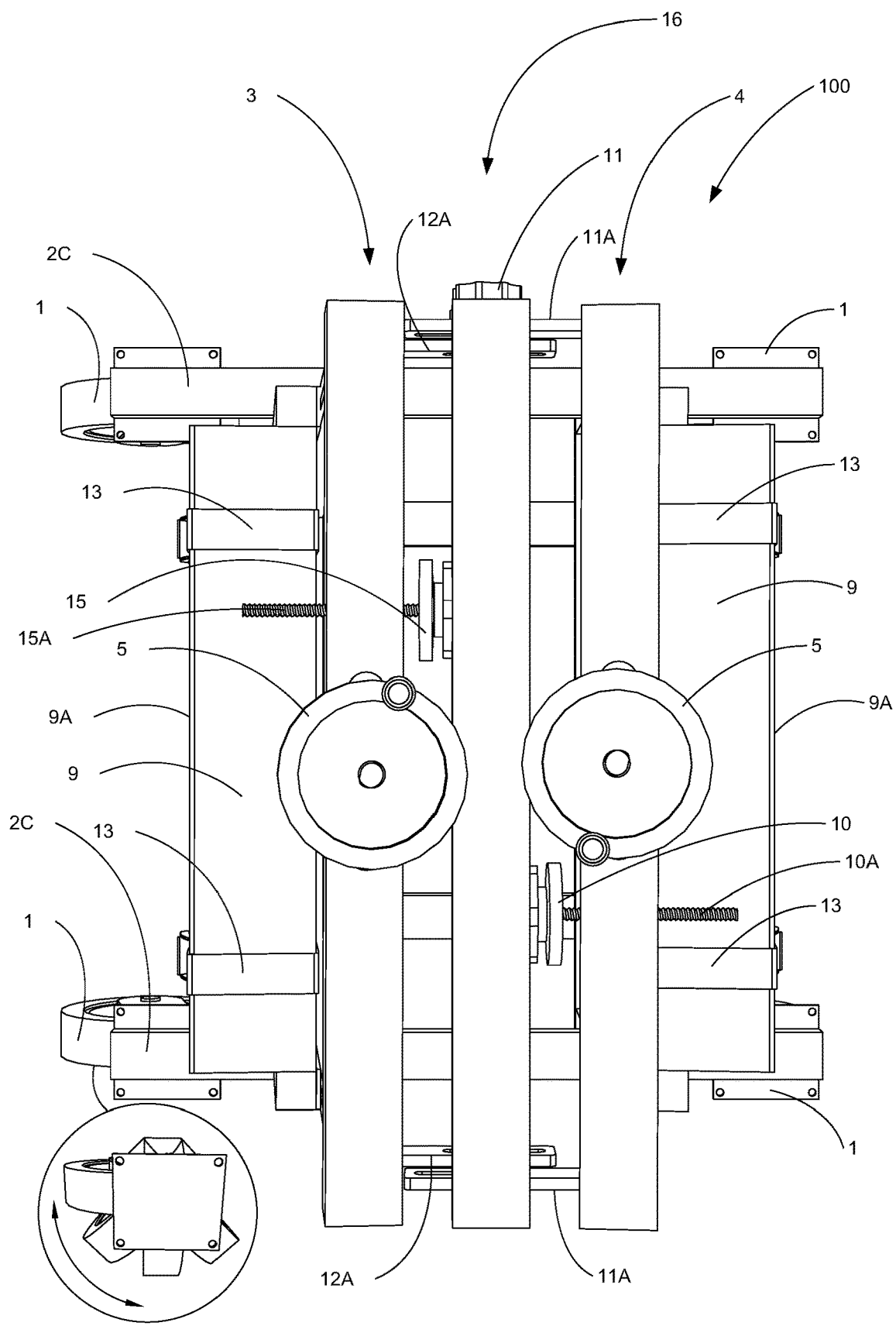
FIG. 1 illustrates the top of the present disclosure for a 2-door vehicle, with no doors removed from vehicle and stored.
Figure 2:
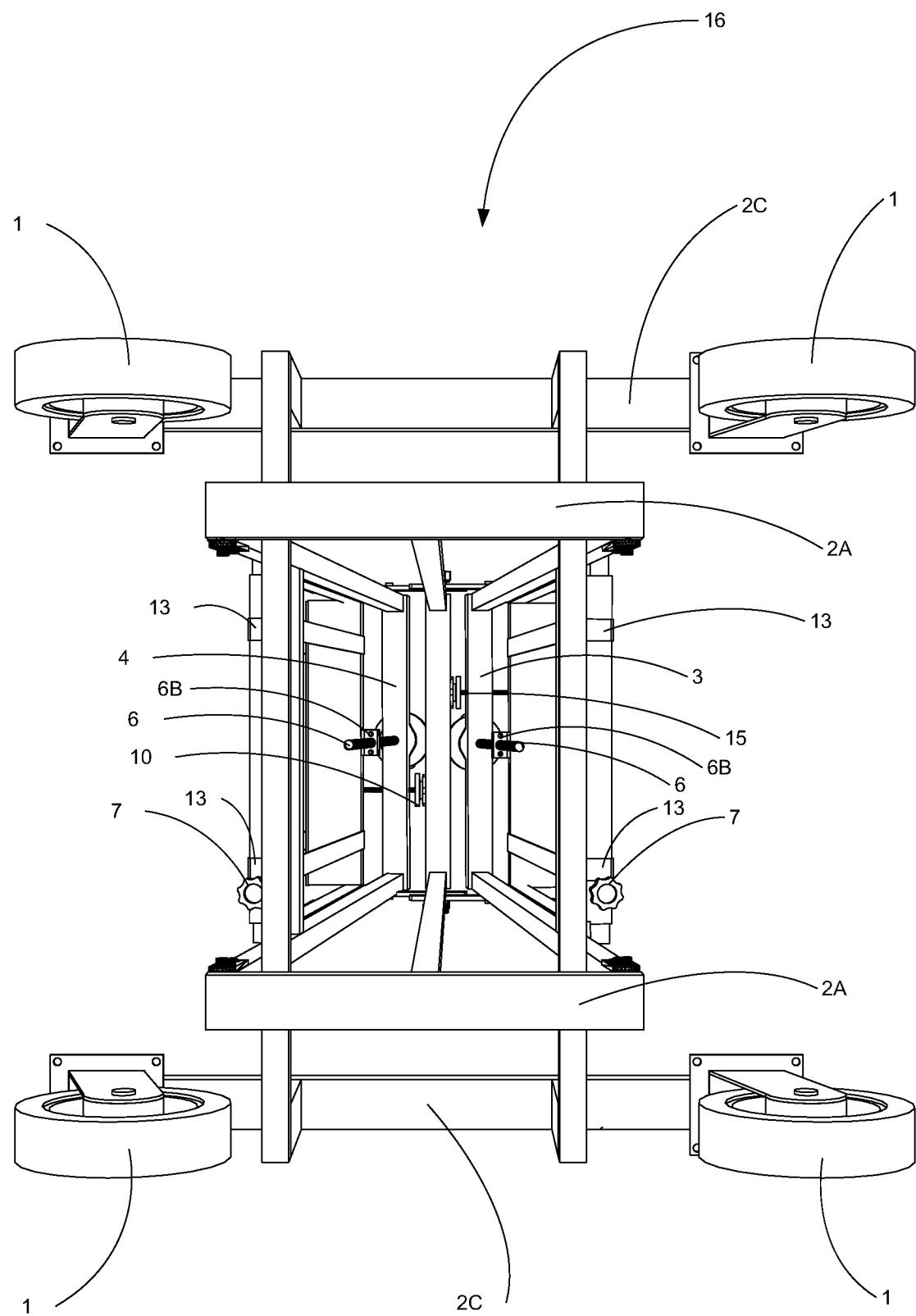
FIG. 2 illustrates the bottom of the present disclosure for a 2-door vehicle, with no doors removed from vehicle and stored.
Figure 3:
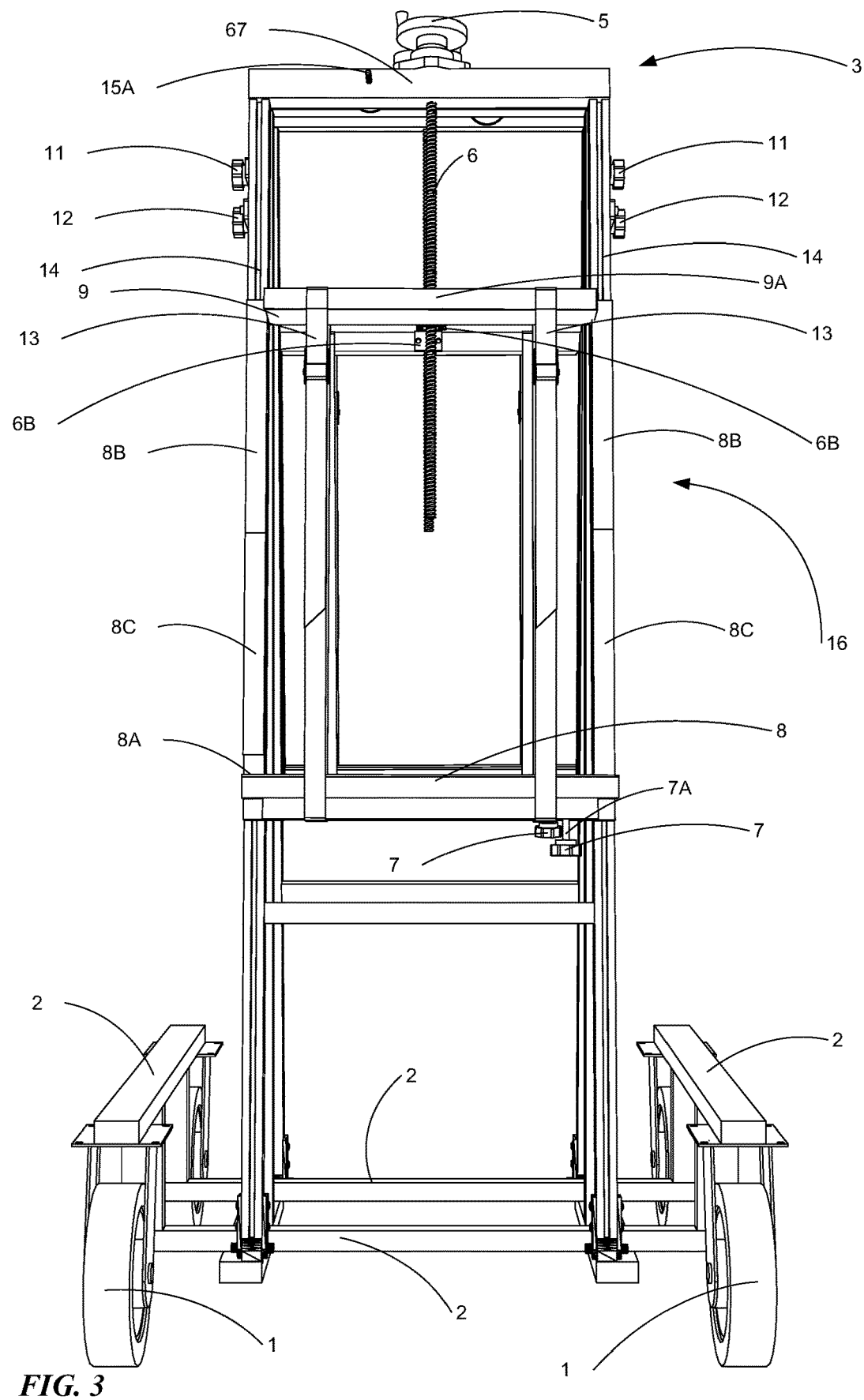
FIG. 3 illustrates the front of the present disclosure for a 2-door vehicle, with no doors removed from vehicle and stored.

FIGS. 1-8 illustrate the details of the present disclosure for the 2-door version 16, in multiple views. Initially focusing on FIG. 5, the base frame 2 is supported by 4 large caster wheels (or simply "casters") 1. In one preferred embodiment, all of the casters are the same size, e.g., 5" polyurethane swivel casters. The caster wheels shown in the figures are swivel casters, i.e., the wheel in the caster can rotate on the vertical axis (typically 360°) while under load (as seen in FIG. 1 insert). The illustrated embodiments of base frame 2 include the upper horizontal base frame members 2C which are attached to casters 1. The vertical base frame members 2B extend downward from upper horizontal base frame members 2C and support lower horizontal base frame members 2A. This structure shows the lower horizontal base frame members 2A are positioned well below the tops of all four casters seen in the figures, at a height approximately equal (or slightly below) the pins (axles) of the caster wheels.

Figure 5:
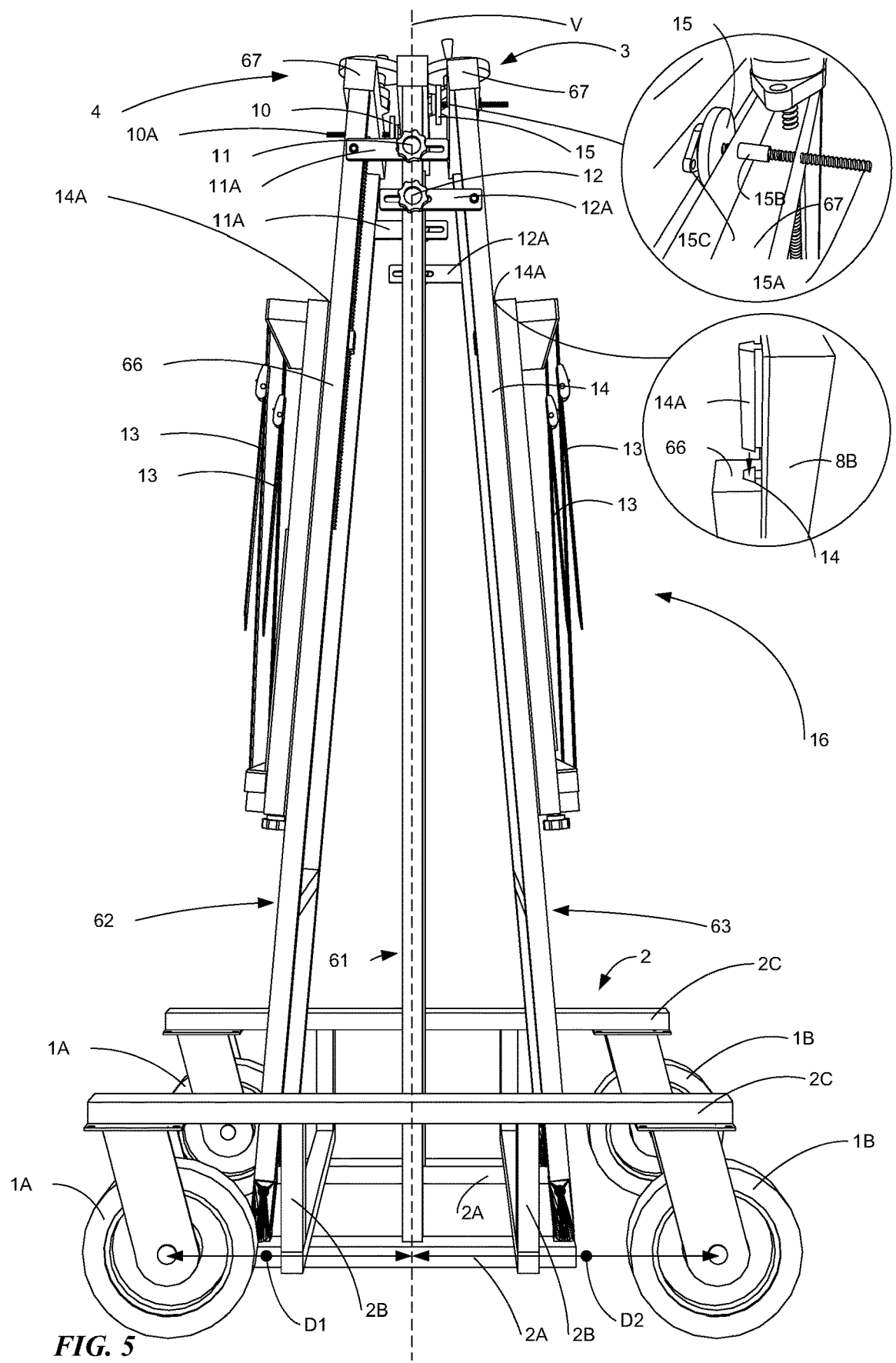
FIG. 5 illustrates the left of the present disclosure for a 2-door vehicle, with no doors removed from vehicle and stored.
Figure 6:
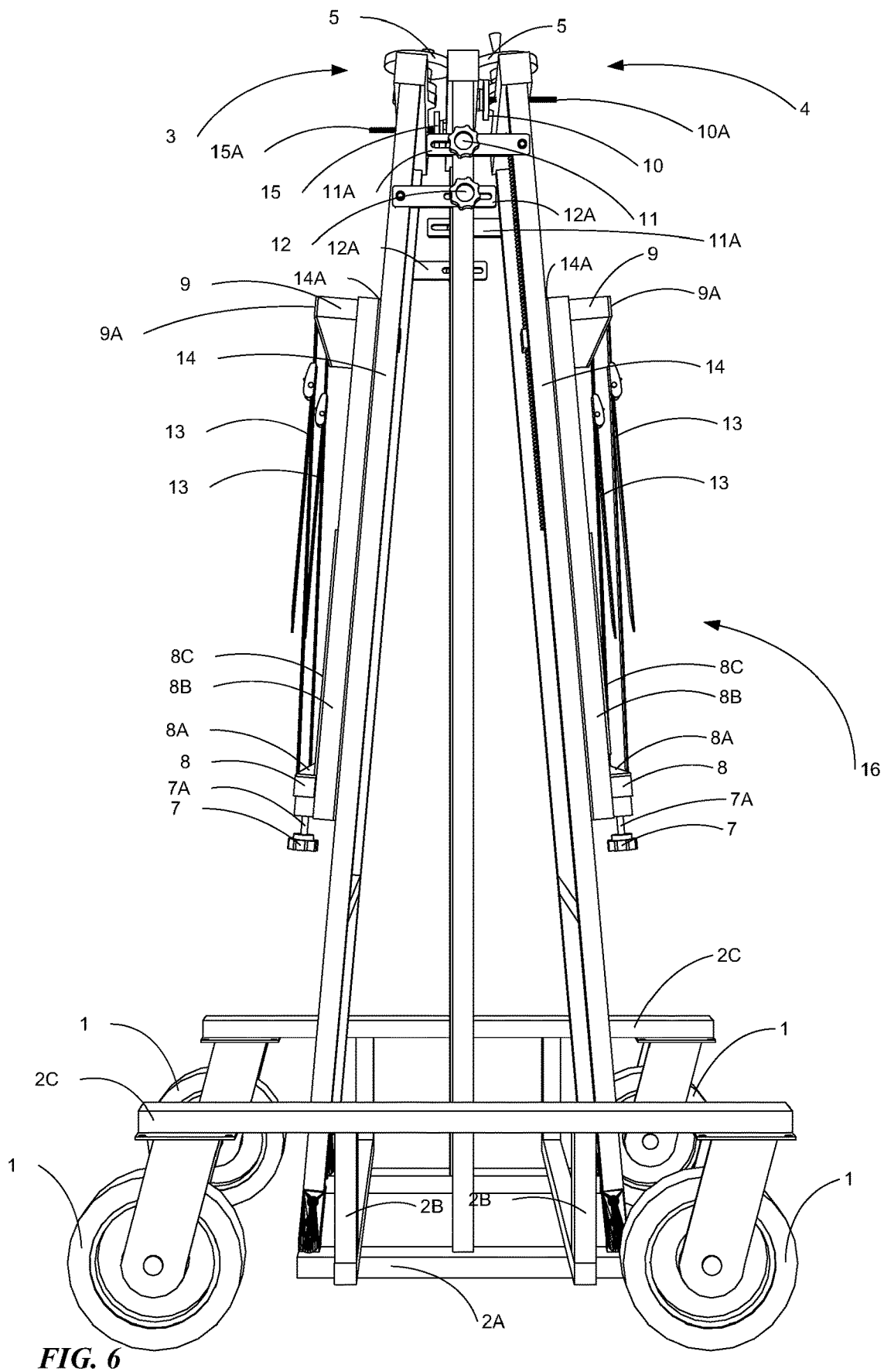
FIG. 6 illustrates the right of the present disclosure for a 2-door vehicle, with no doors removed from vehicle and stored.
Figure 7:
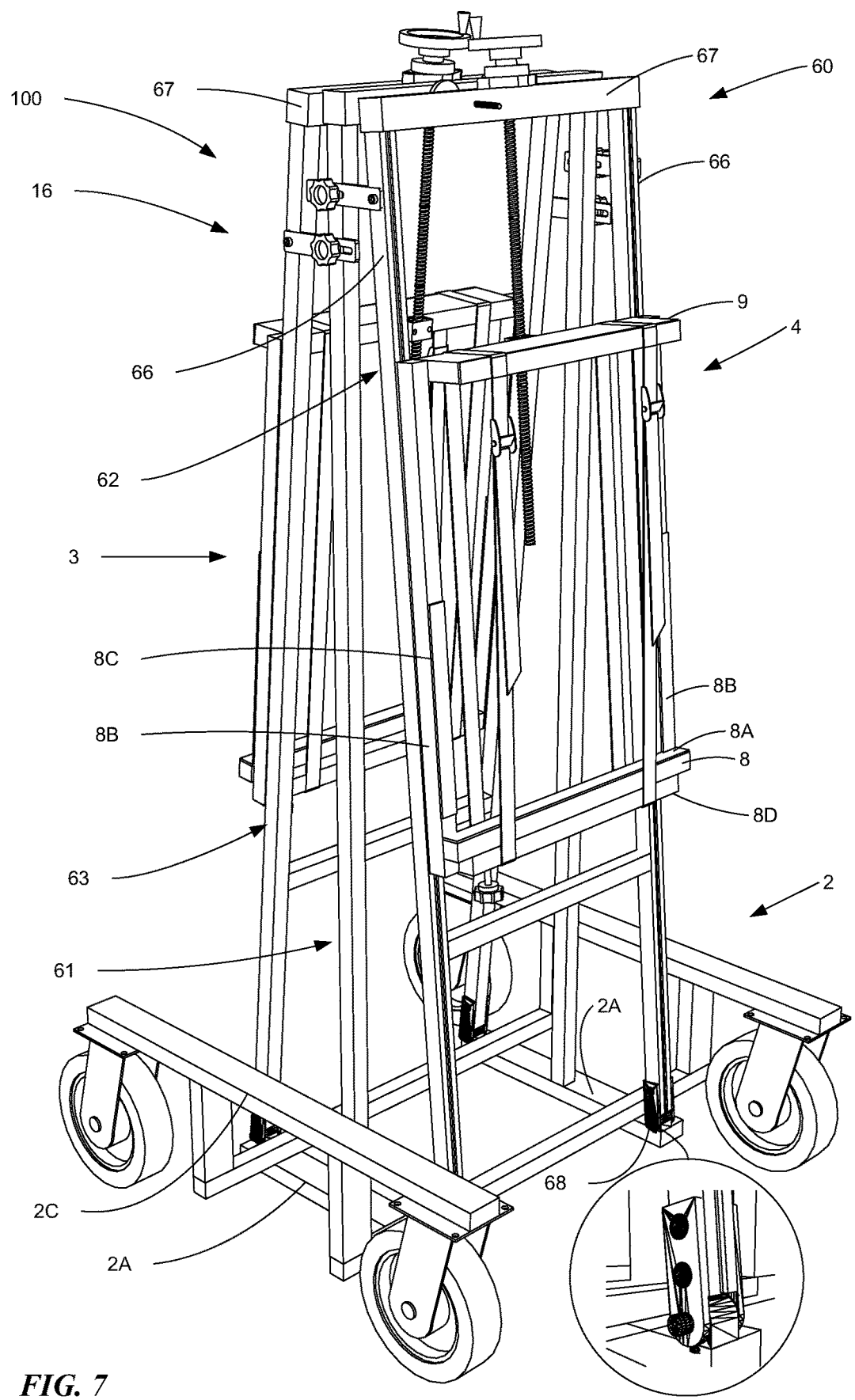
FIG. 7 illustrates the isometric view of the present disclosure for a 2-door vehicle, with no doors removed from vehicle and stored.
Figure 8:
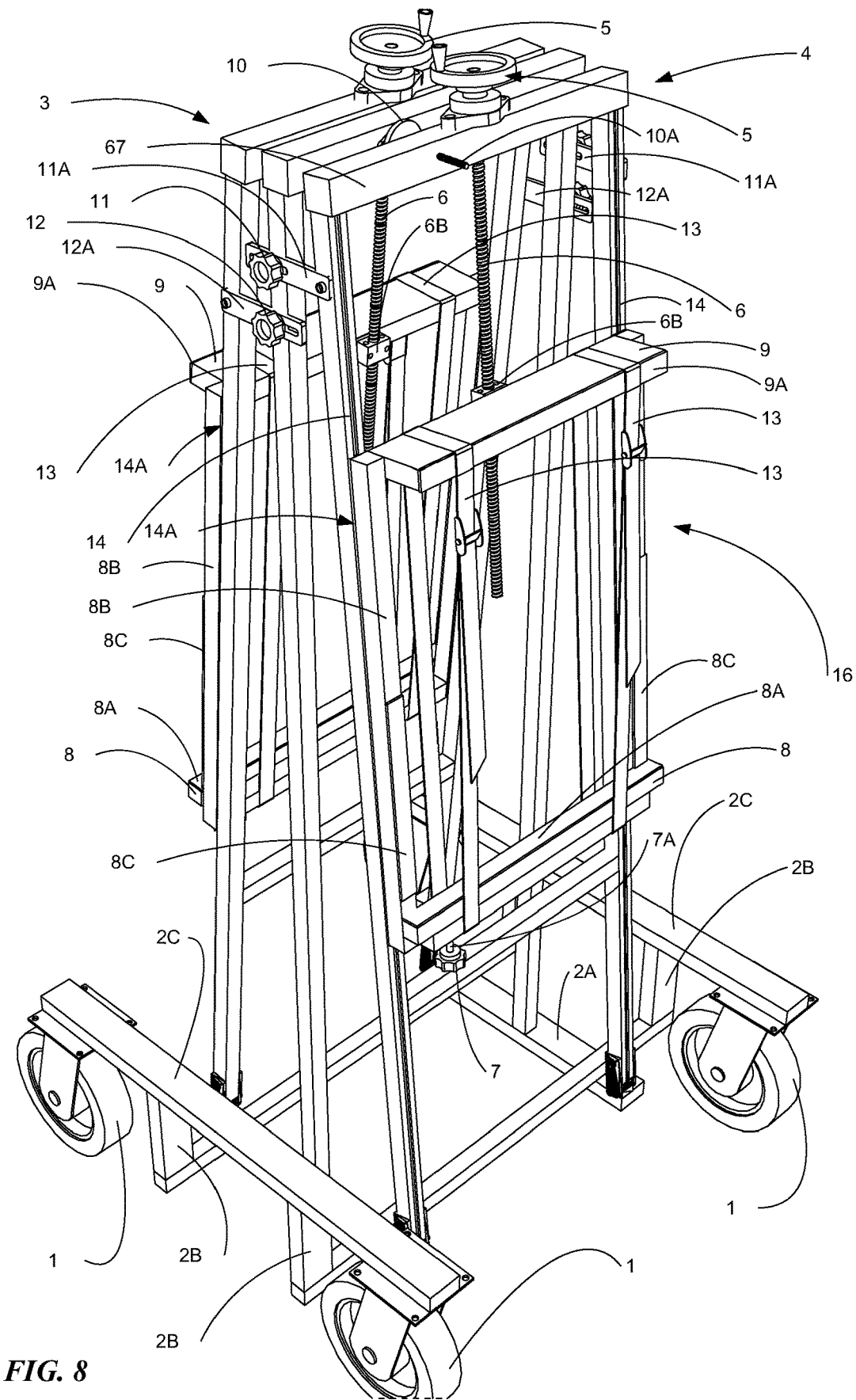
FIG. 8 illustrates the perspective view of the present disclosure for a 2-door vehicle, with no doors removed from vehicle and stored.

Viewing FIG. 7, the vertical frame structure 60 extends upward from base frame 2. Vertical frame structure 60 generally comprises central frame section 61, first side frame section 62, and opposing second side frame section 63. Each of the frame sections 61, 62 and 63 are formed of two vertical members 66 topped by an upper horizontal member 67. The lower ends of vertical members 66 (on first and second side frame sections 62, 63) are pivotally attached or pinned at 68 to lower horizontal base frame members 2A. FIG. 5 suggests how central frame section 61 connects to the lower horizontal base frame members 2A approximately equal-distant between a first side pair of casters 1A and a second side pair of casters 1B (see distances D1 and D2). Likewise, the side frame sections 62, 63 also connect to the lower horizontal base frame member 2A between the pairs of casters 1A and 1B. Since the lower horizontal base frame members 2A are positioned at a height approximate the pins of the caster wheels, the overturn moment of the overall door storage system 100 is reduced. This combined with the vertical frame structure being centered around the vertical centerline "V" between the casters 1 provides the vehicle door storage system 100 increased stability.

Returning to FIG. 7, first side frame section 63 and second side frame section 62 each have driver's and passenger's side lifting mechanisms (also referred to as "door carriers") 3 and 4, respectively, mounted thereon. The 2-door version 16 of system 100 has mirrored door carriers 3 and 4; i.e., for driver's side door 22B and passenger's side door 22A (see FIGS. 24 and 25). Still viewing FIG. 7, the door carrier 4 is generally formed by the two vertical frame members 8B connected by the lower frame member 8D and the upper frame member 9 (which also forms the upper door rest 9). As seen in one FIG. 5 insert, the side of vertical frame members 8B facing the vertical member 66 will have nylon T-slot bearing material 14A extending along their length, and this T-slot bearing material 14A will engage the channels 14 in the vertical members 66. It will be understood that this allows the door carriers to slide up and down first and second side frame sections 62, 63 with very little frictional resistance.

Figure 4:
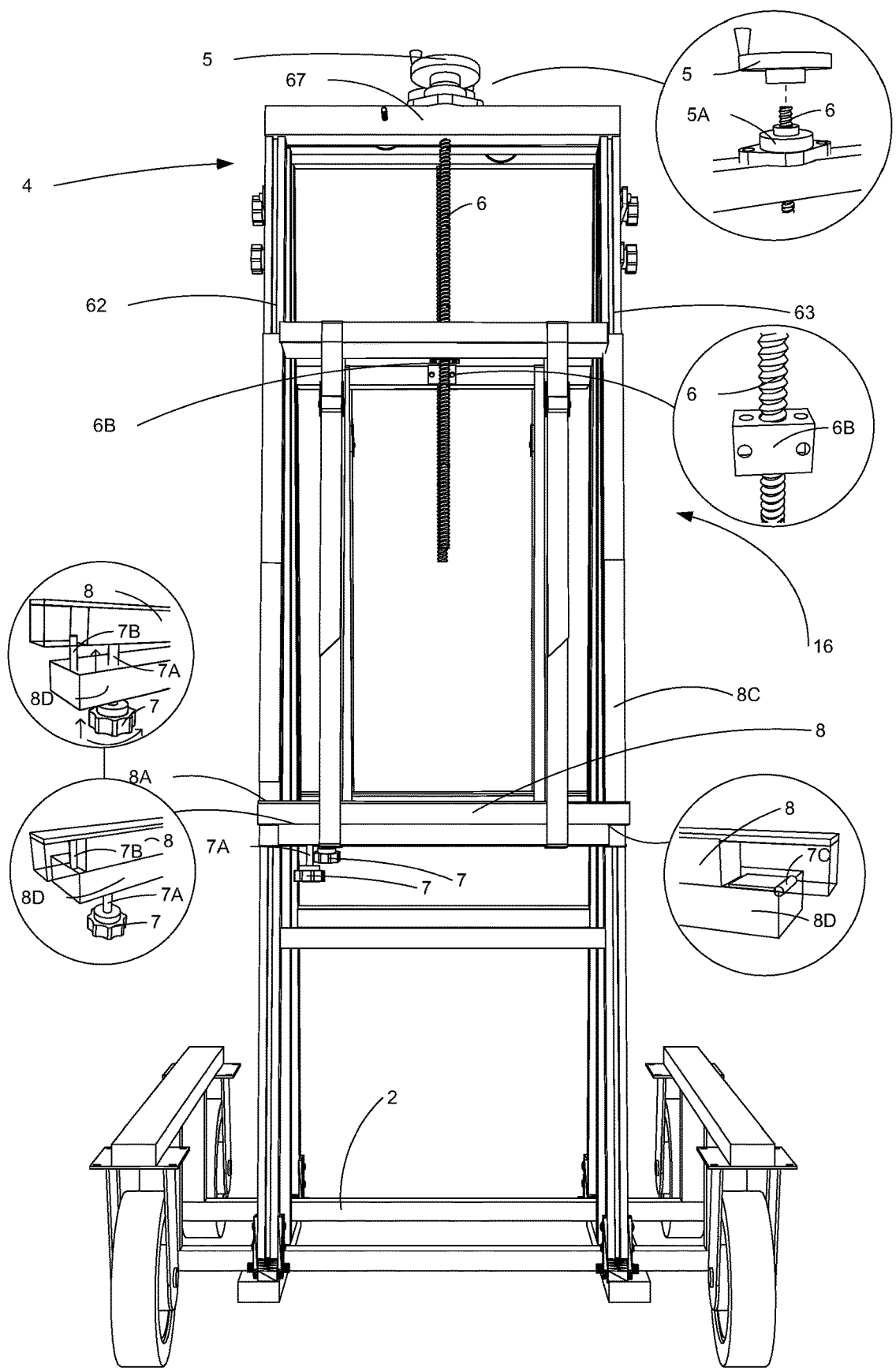
FIG. 4 illustrates the back of the present disclosure for a 2-door vehicle, with no doors removed from vehicle and stored.

Viewing FIG. 4, in order to lift a vehicle door upwards for removal and lower for re-installation, a crank handle 5 is rotated by the user. The crank handle is connected to the top of a jack screw 6, which extends through bearing assembly 5A mounted on upper horizontal member 67. After passing through upper horizontal member 67, jack screw 6 extends to and engages a corresponding jack screw nut 6B mounted to the inner side of the upper frame member/door rest 9. Thus, rotating crank handle 5 turns jack screw 6 causing the door carriers to slide up and down side frame sections 62, 63. The jack screws 6 may sometimes be referred to as a third threaded member (or third adjustment mechanism) which causes the door carries to move up and down on side frame sections 62, 63.

Figure 30:
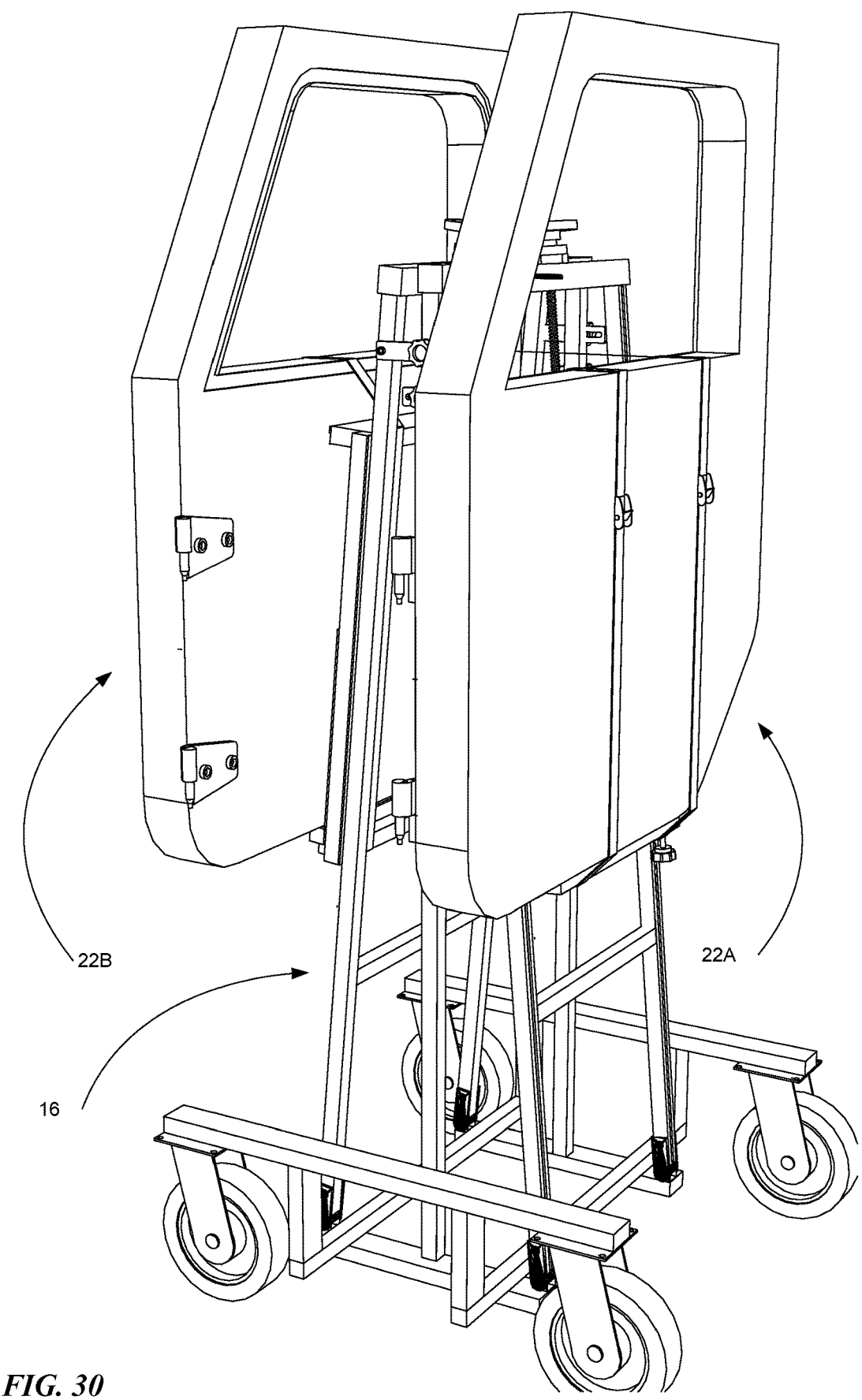
FIG. 30 illustrates the both doors securely stored on the present disclosure, with the present disclosure moved away from the vehicle, in a storage location (garage, covered parking area, etc.).
Figure 44:
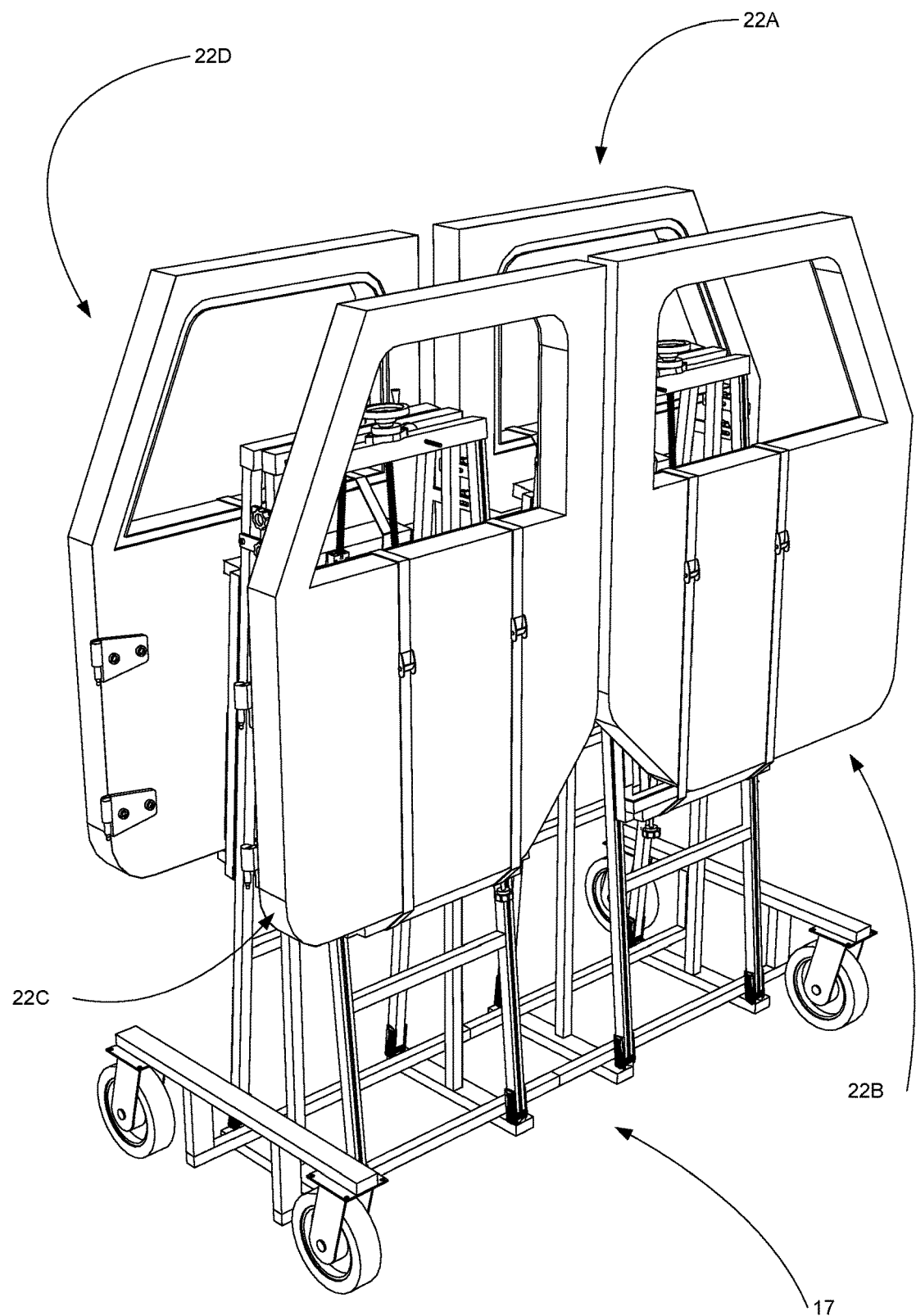
FIG. 44 illustrates all 4 doors securely stored on the present disclosure, with the present disclosure moved away from the vehicle, in a storage location (garage, covered parking area, etc.).

Returning to FIG. 7, positioned on door carrier lower frame member 8D is the lower door rest 8. Lower door rest 8 includes the felt strips 8A to protect the painted lower edge of the vehicle door. The lower door rest 8 will bear the weight of the vehicle doors as those doors are transferred to vehicle door storage system 100. As best seen in the insert of FIG. 4, another jack screw 7A, in combination with its knob 7 and an internal jack screw nut (hidden from view) within the lower frame member 8D, provide the door carriers with the ability to tilt the door relative to lower frame member SD by raising and lowering one end of the lower door rest 8. It will be understood that jack screw 7A extends through lower frame member 8D (and enclosed jack screw nut) to engage the bottom of the lower door rest 8, The guide pin 7B aids in maintaining alignment between lower door rest S and lower frame member SD. The opposite end of lower door rest 8 is pivotally attached to lower frame member 8D by hinge 7C. Adjusting the lower door rest 8 up or down, provides adjustment of the device to precisely match the angle of the vehicle doors 22A, 22B, 22C, 22D (FIGS. 30 and 44). The jack screws 7A may sometimes bet referred to as a first threaded member (or first adjustment mechanism) which causes the lower door rests 8 to rotate with respect to the door carriers. Once adjusted to match the angle of the lower painted edge of the doors 22A, 228, 22C, 22D, the lower door rest S also provides the support to lift the door. In certain embodiments, the jack screw 7A is configured to allow the lower door rest 8 to rotate up to 5° with respect to the lower frame member 8D of the door carriers (but other embodiments could have adjustment ranges anywhere between 2.5° and 15°). The lower portions of the vertical frame members 8B that connect the upper door rest 9 to the lower door rest 8 are also padded with felt 8C. The painted face of the vehicle's doors 22, 37, when supported by the lower door rest 8 on the protective felt strip 8A, also rest against the padded felt 8C.

Viewing FIG. 5, it can be seen how first and second side frame sections 62, 63 are configured such that their upper horizontal members 67 adjustably tilt toward and away from center frame section 61, The jack screws 10A, 15A, (operated by their knobs 10, 15) will engage internal jack screw nuts 15B within each side frame section's upper horizontal member 67, thereby providing a range of adjustment of the upper door rest 9 on the door carriers. The jack screws 10A, 15A may sometimes be referred to as a second threaded member (or second adjustment mechanism) which causes the first and second side frame sections to translate toward and away from the vertical axis. This assembly provides further adjustment of the device to precisely match the angle of the door faces 22A, 22B, 22C, 22D (FIGS. 30 and 44). In certain embodiments, the jack screws 10A, 15A are configured to allow the upper horizontal members 67 to move between 0.5 and 5.0 inches from the vertical axis V (or the center of central frame member 61). Once the adjustment is made by knobs 10, 15 in combination with jack screws 10A, 15A, locking knobs 11 and 12, along with locking brackets 11A and 12A are implemented to secure the final angle of adjustment. After all angle adjustments are made to the lower rest 8 and upper door rest 9, 2 lashing straps 13 are used, per door carrier, (i.e., per vehicle door) to secure the door to the door carrier. The lashing straps 13 wrap around both the lower door rest 8 and the upper door rest 9 and finally over the vehicle doors 22A, 22B, 22C, 22D (see FIGS. 30 and 44), fully securing the doors to the system 100. Once the door is fully secured to the system 100, the crank handle 5 is rotated clockwise, rotating the jack screw 6 through the jack screw nut 6B. This will exert an upward force on the upper door rest 9. With the 2 vertical posts 8B attached to the upper door rest 9 as well as to the lower door rest 8, this will cause these elements to slide up the vertical member 66. With the door 22A, 226, 22C, 22D fully secured, this will lift the door off the vehicle's receiving hinge mounts 35 and 36 (see FIG. 22).

Figure 9:
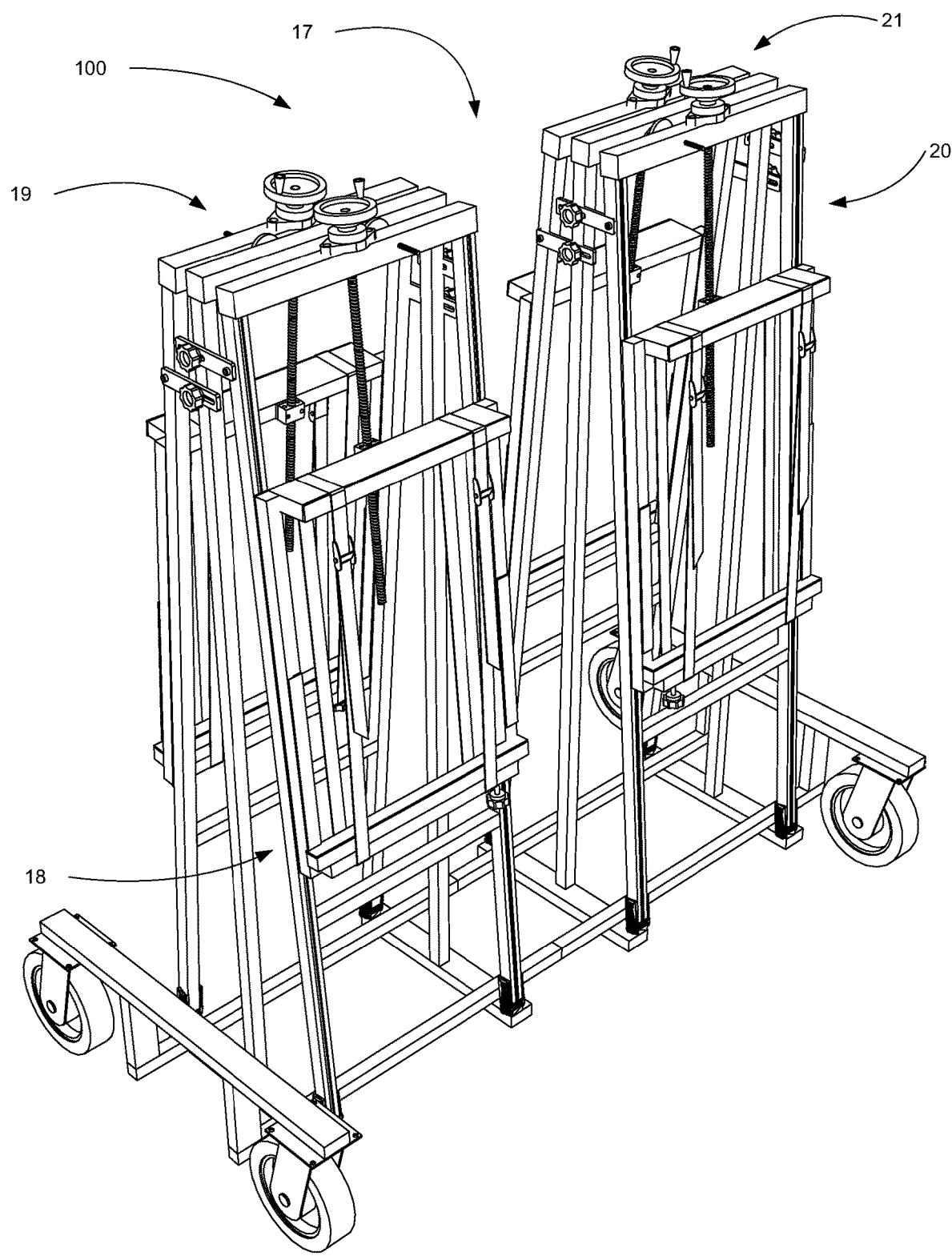
FIG. 9 illustrates the perspective view of the present disclosure for a 4-door vehicle, with no doors removed from vehicle and stored.

FIG. 9 illustrates an expanded version of the 2-door model to accommodate 4-door vehicles 17. The 4-door device 17 will accommodate the passenger side, front door 22A on the lift designated as 18. Driver's side front door 22B will be accommodated on the lift designated as 19. Passenger's side, rear door 22C is accommodated on the lift designated as 21. Driver's side, rear door 22D is accommodated on the lift designated as 20.

Figure 10:
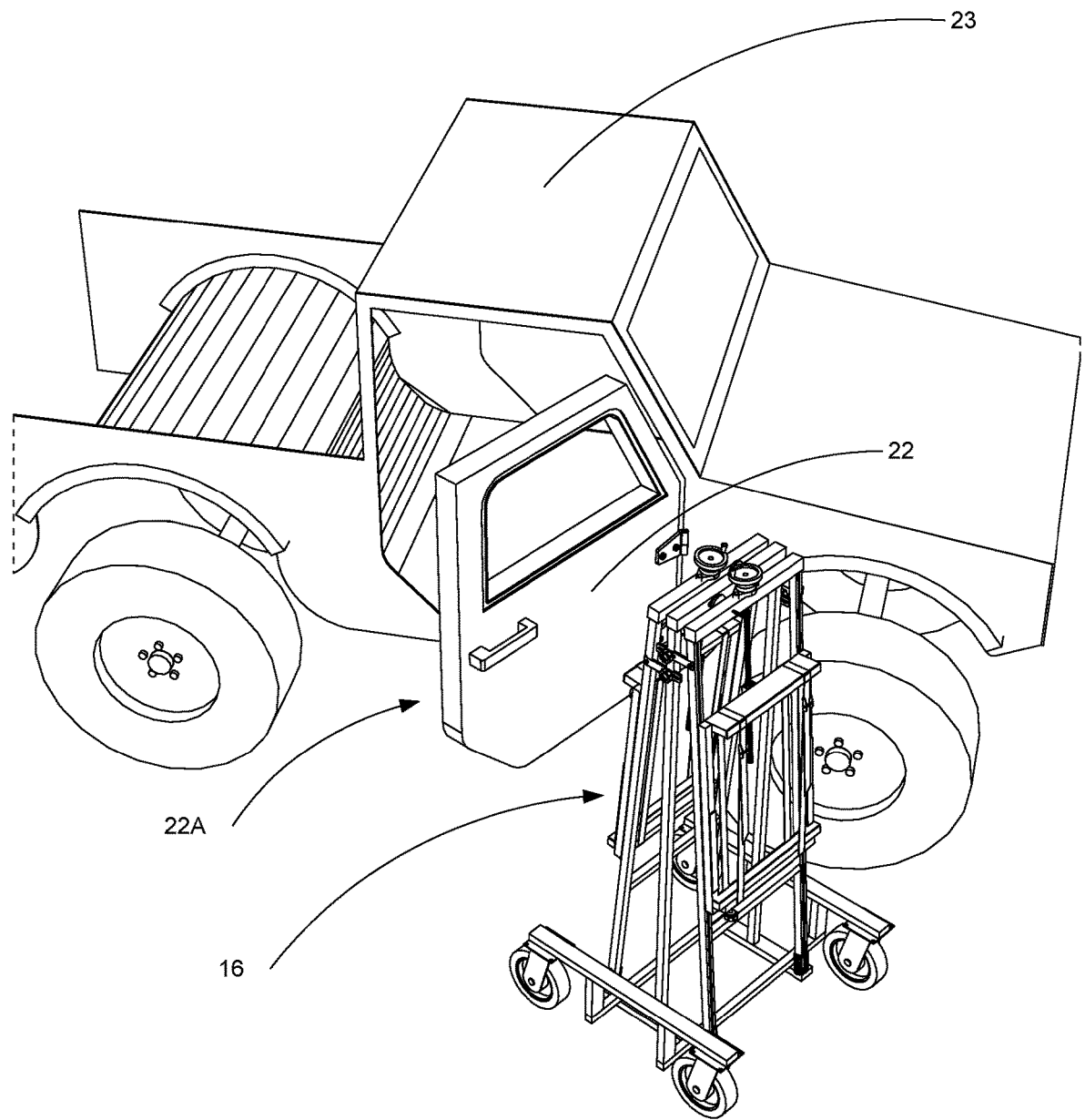
FIG. 10 illustrates the perspective view of the present disclosure approaching the passenger door of a 2-door vehicle, in preparation to remove the passenger side (RIGHT) door.
Figure 11:
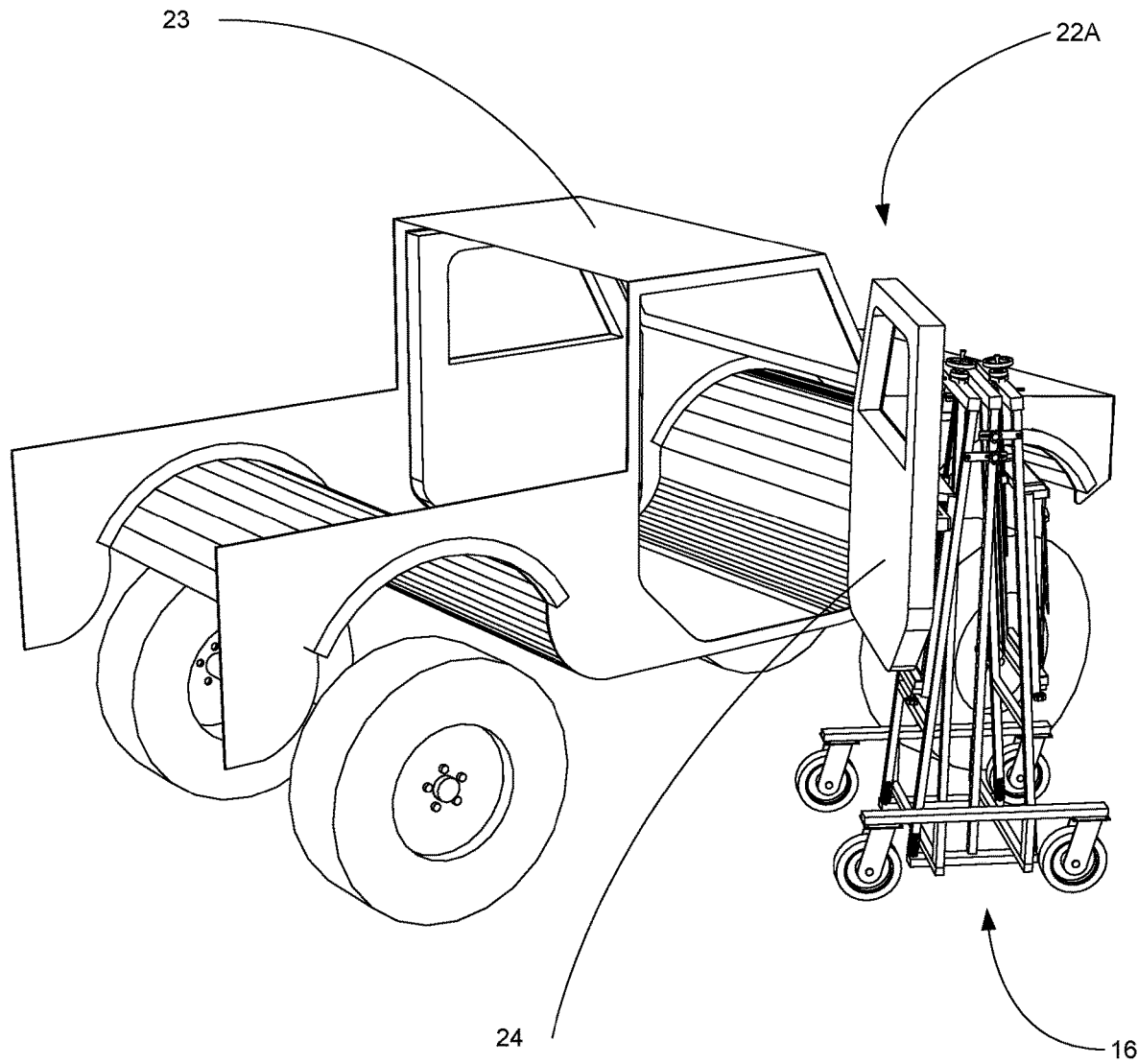
FIG. 11 illustrates the present disclosure close to the painted side of the passenger door of a 2-door vehicle, in preparation to remove the passenger side (RIGHT) door.
Figure 12:
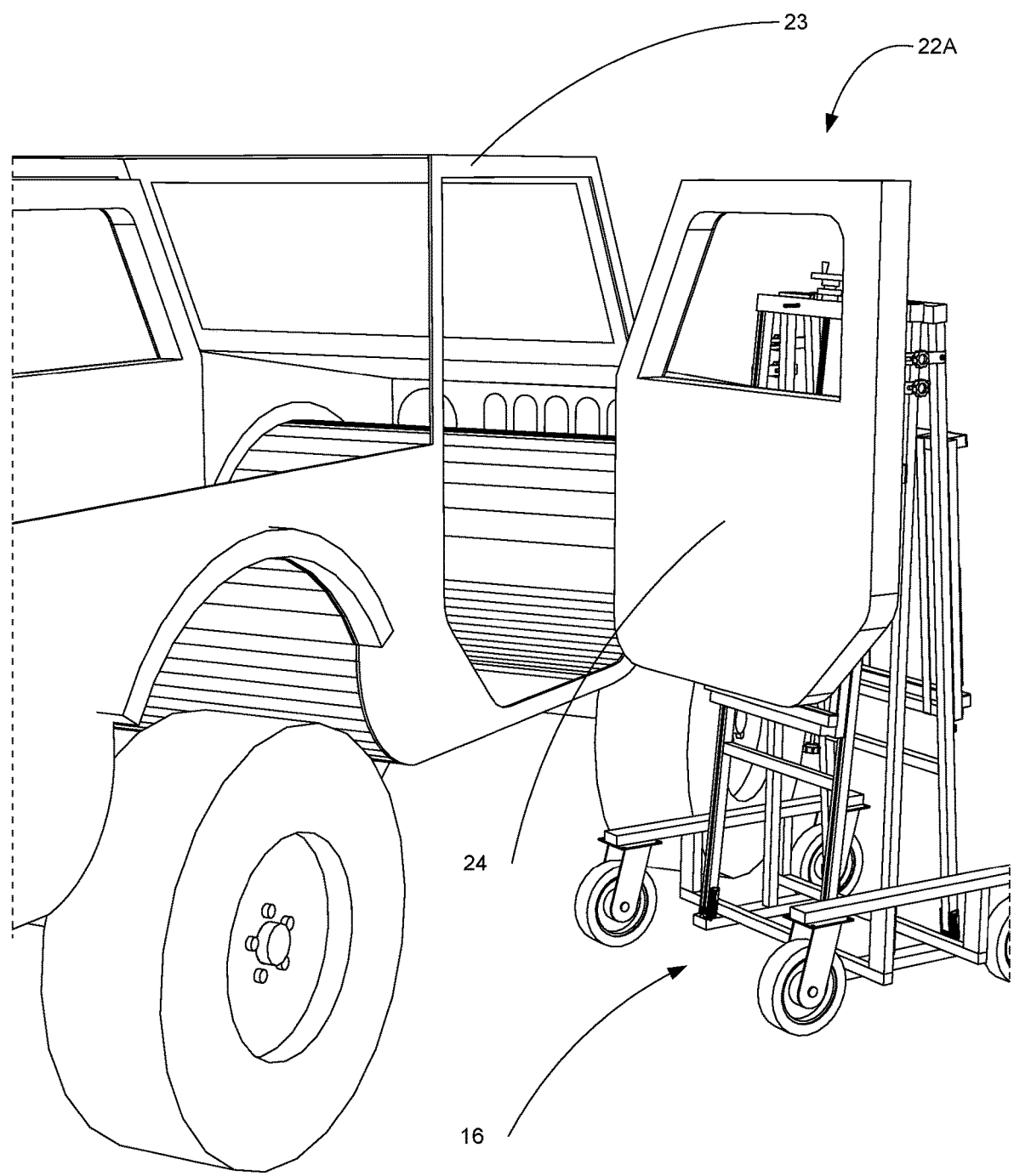
FIG. 12 illustrates another view of the present disclosure close to the painted side of the passenger door of a 2-door vehicle, in preparation to remove the passenger side (RIGHT) door.
Figure 13:
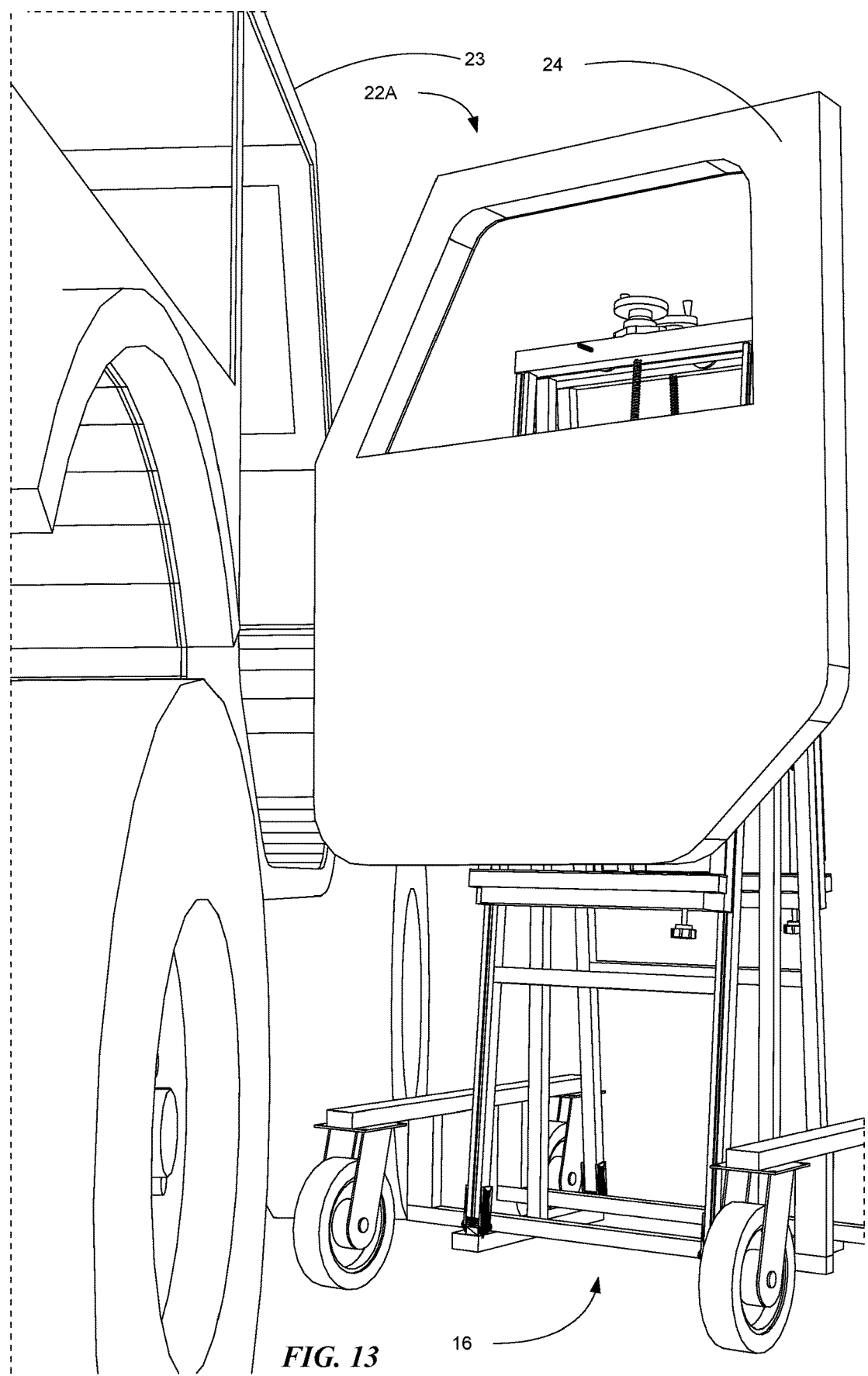
FIG. 13 illustrates a close up view of the present disclosure close to the painted side of the passenger door of a 2-door vehicle, in preparation to remove the passenger side (RIGHT) door.
Figure 14:
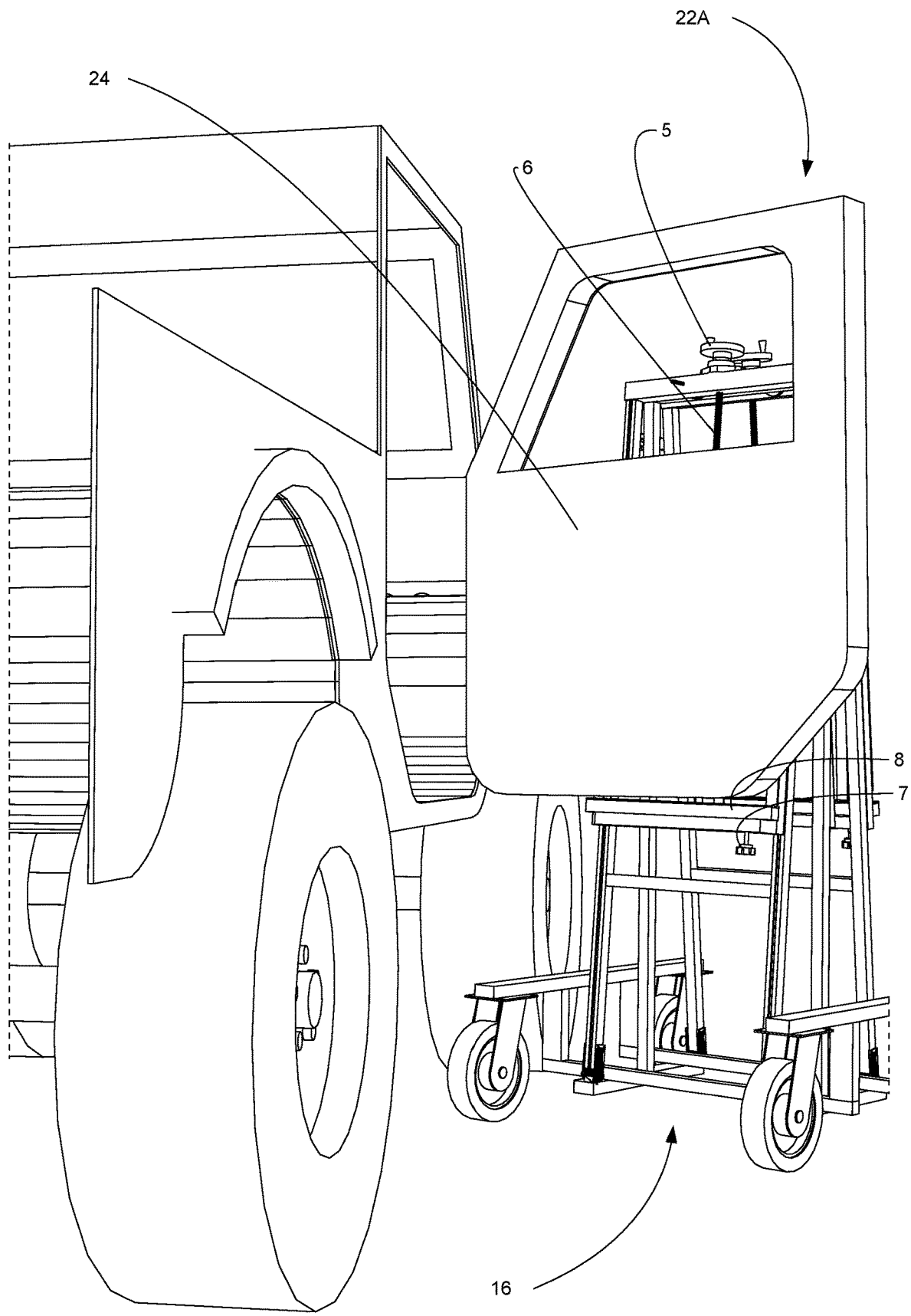
FIG. 14 illustrates a view of the present disclosure close to the painted side of the passenger door of a 2-door vehicle, in preparation to remove the passenger side (RIGHT) door, detailing the components initially used to secure the door for removal.
Figure 15:
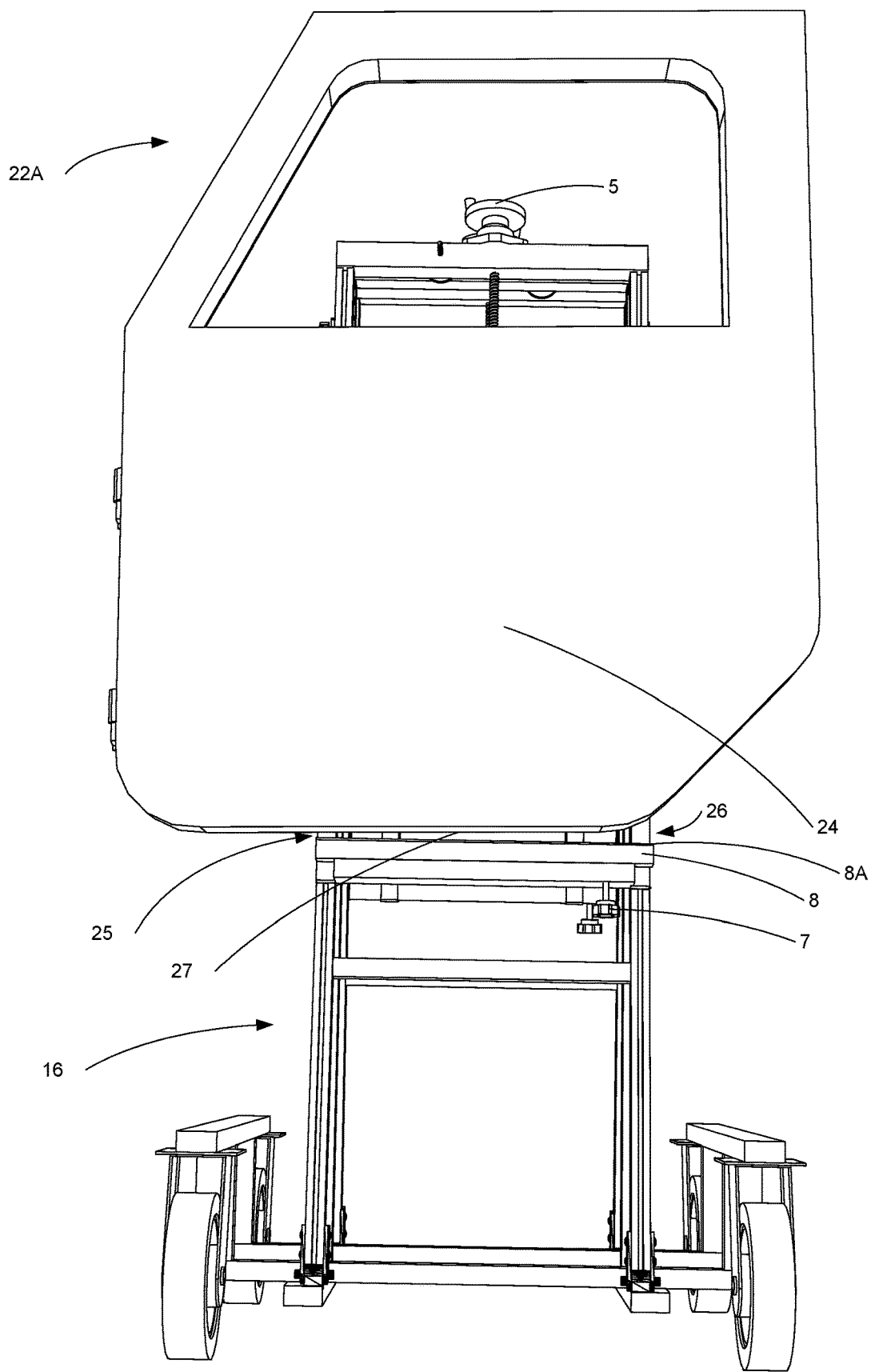
FIG. 15 illustrates the potential for misalignment of the device's lower mounting surface to that of the lower door edge.
Figure 16:
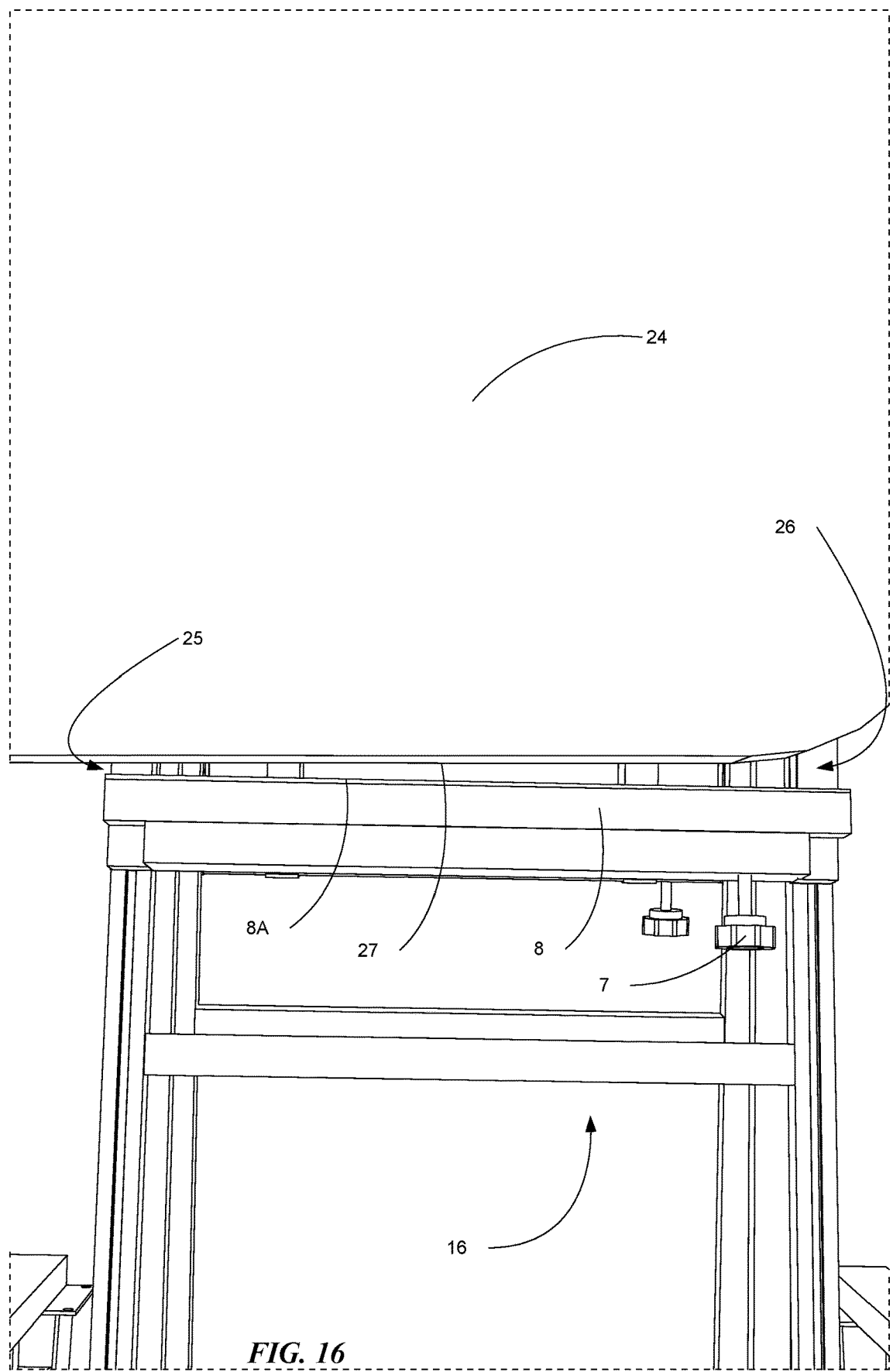
FIG. 16 illustrates a zoomed view of the potential for misalignment of the device's lower mounting surface to that of the lower door edge.
Figure 17:
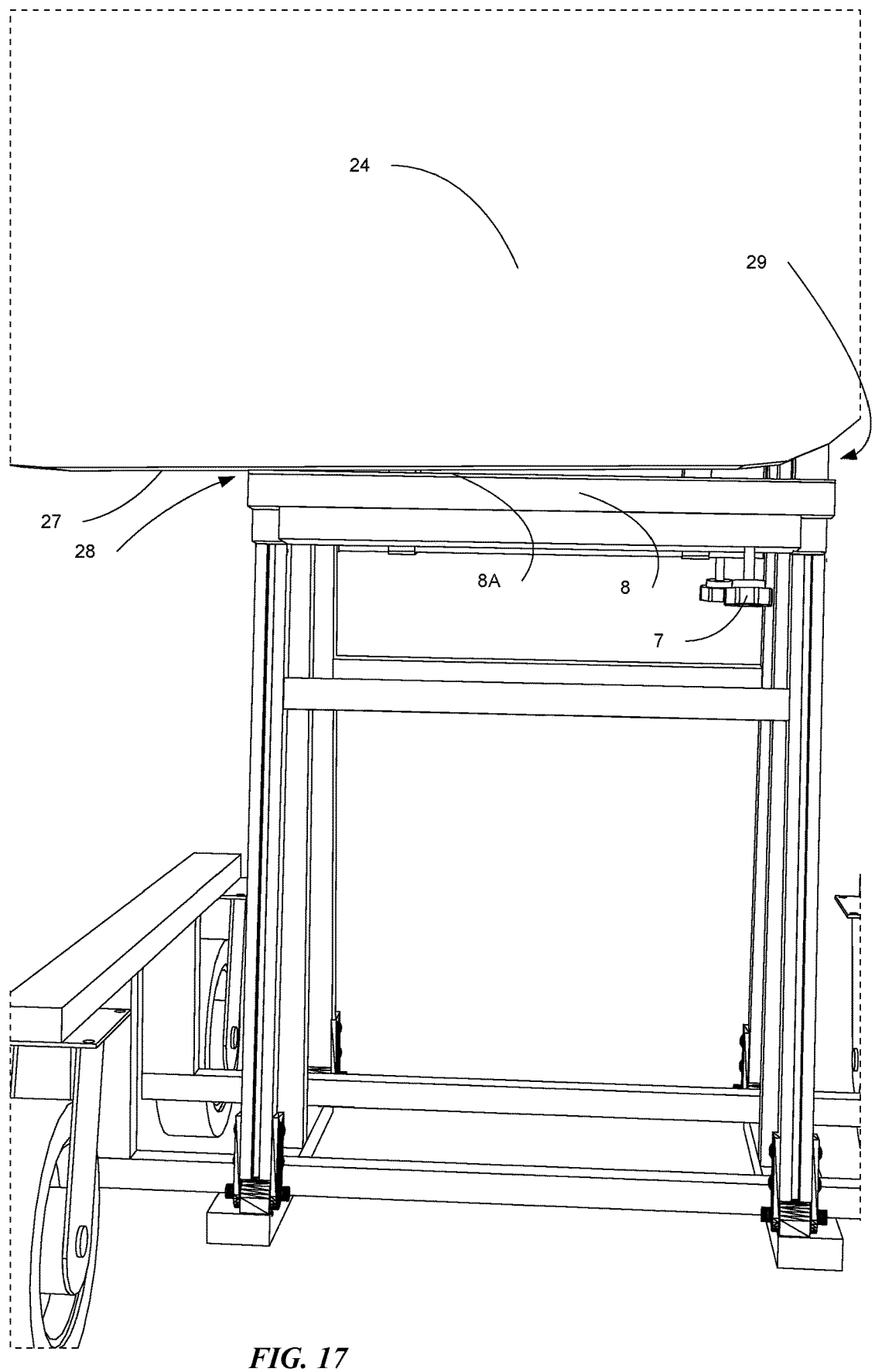
FIG. 17 illustrates the initial adjustment to secure the door to the lifting device: raising the device's lower mounting surface until it makes initial contact with the door at its highest point.
Figure 18:
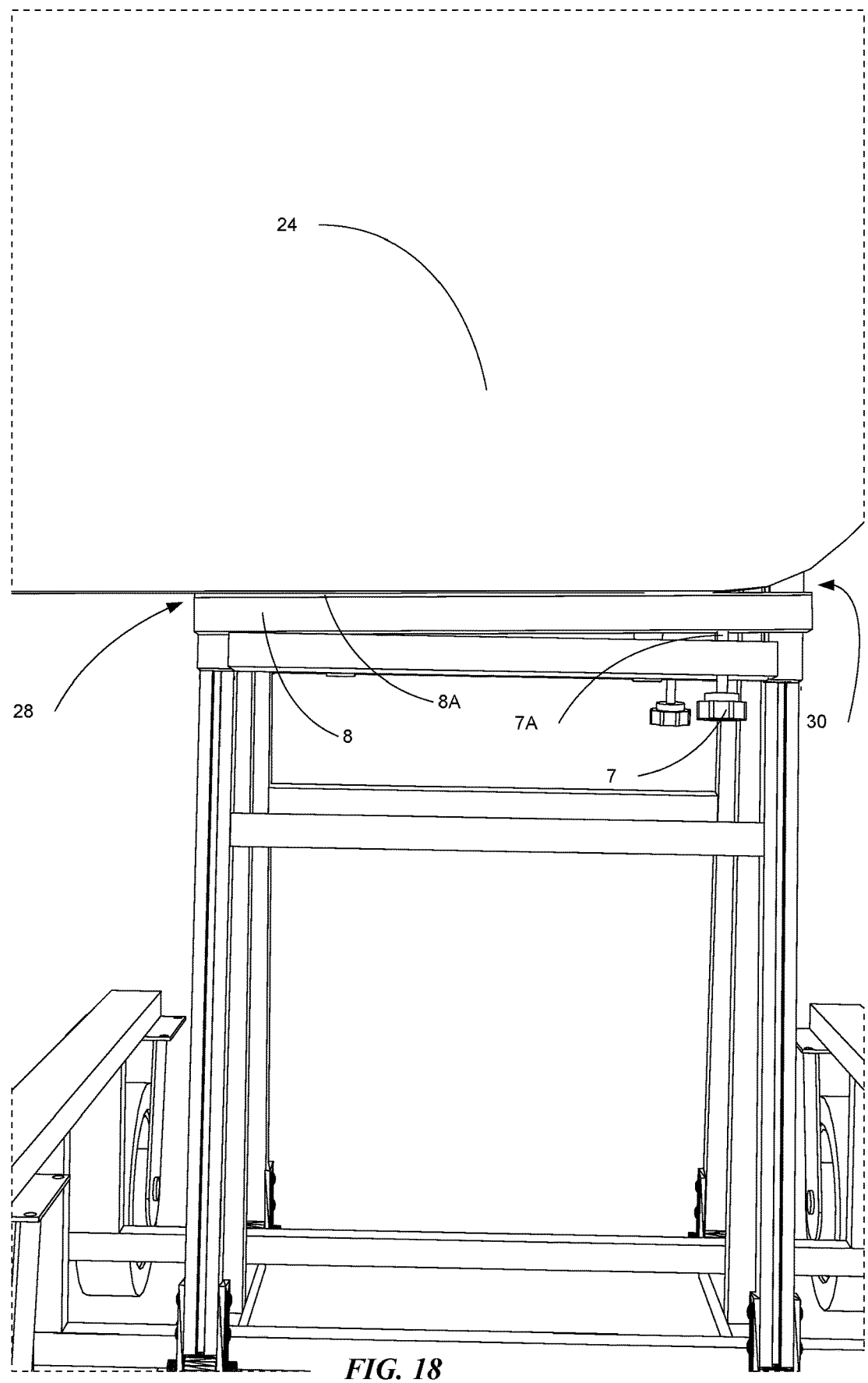
FIG. 18 illustrates the second adjustment to secure the door to the lifting device: raising the right side of the device's lower mounting surface to match the angle of the door's lower edge.
Figure 19:
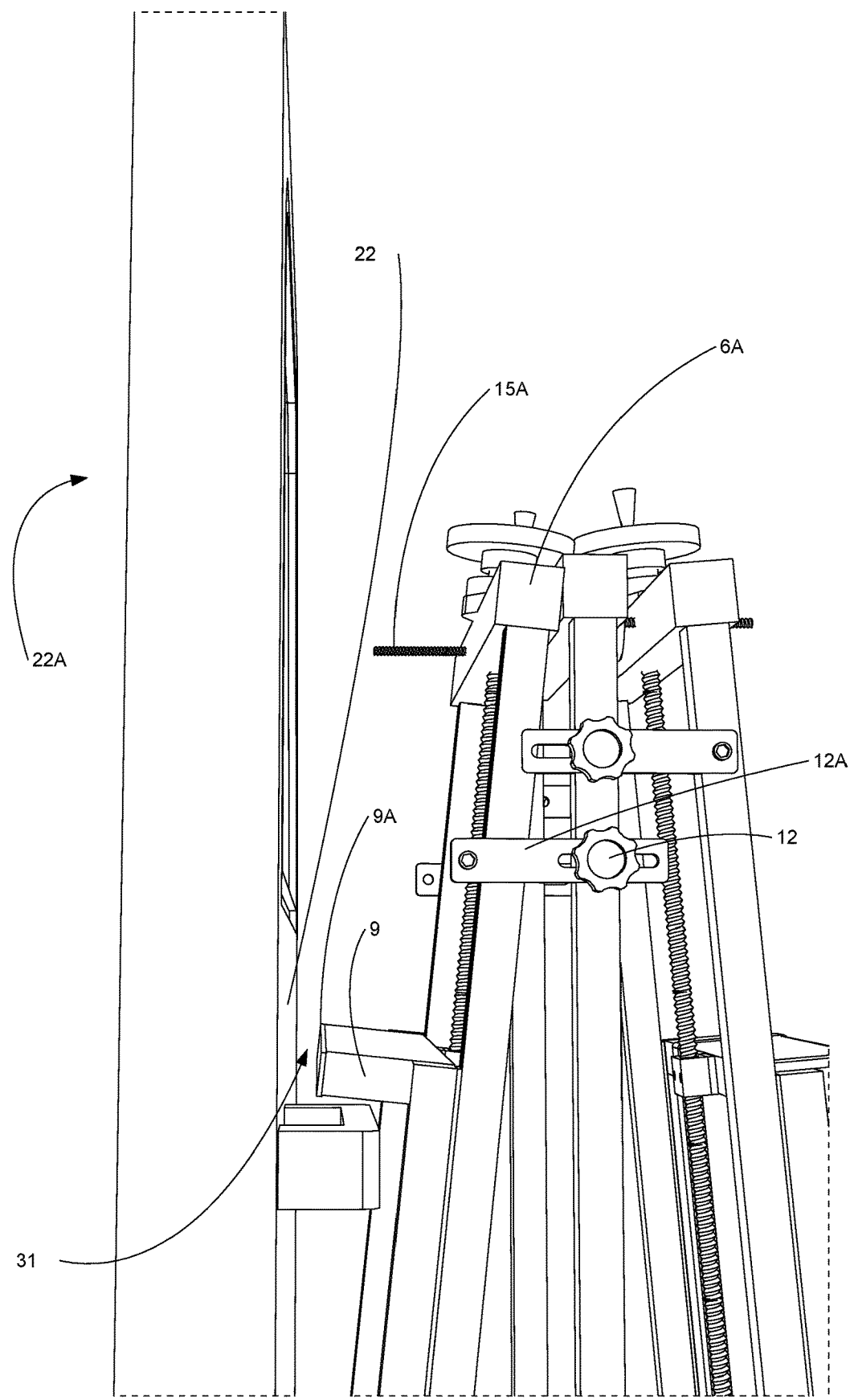
FIG. 19 illustrates the third required need for adjustment: adjust the angle of the device's upper door mount/rest to match that of the vehicle's painted door surface.
Figure 20:
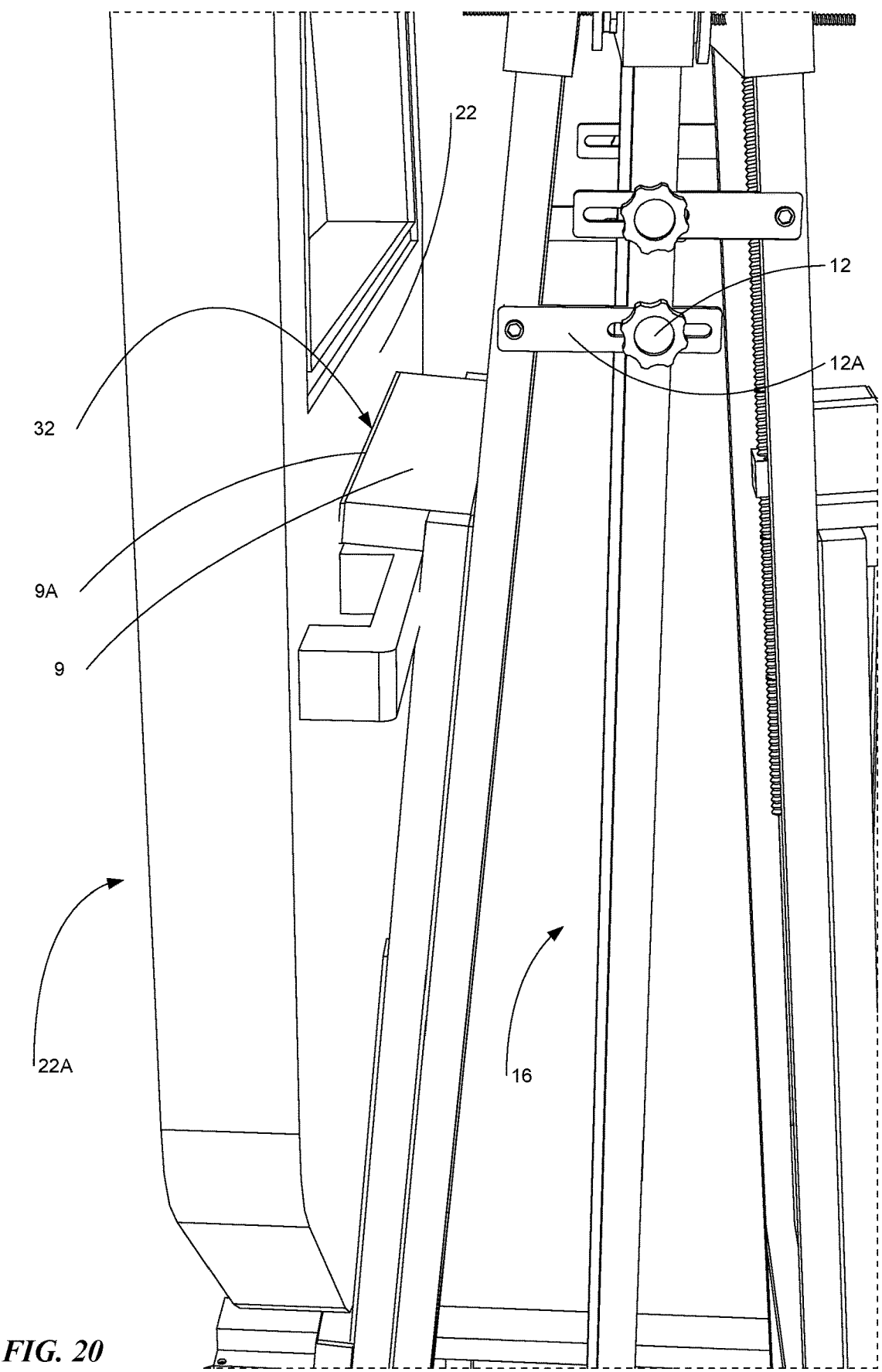
FIG. 20 illustrates the third required need for adjustment executed: the angle of the device's upper door mount rest now matches that of the vehicle's painted door surface.
Figure 21:
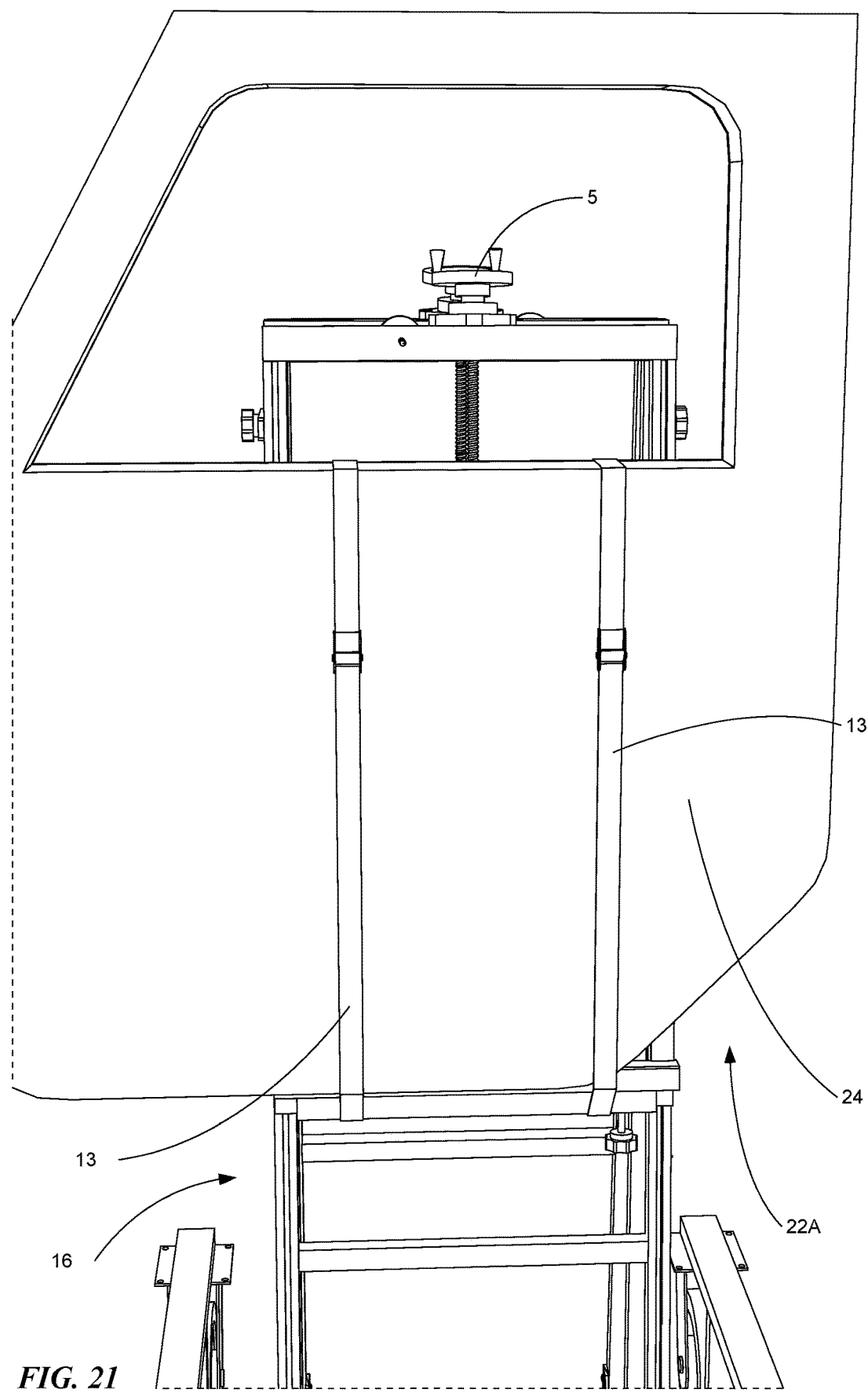
FIG. 21 illustrates the secure attachment of the vehicle's door to the device using lashing straps.
Figure 22:
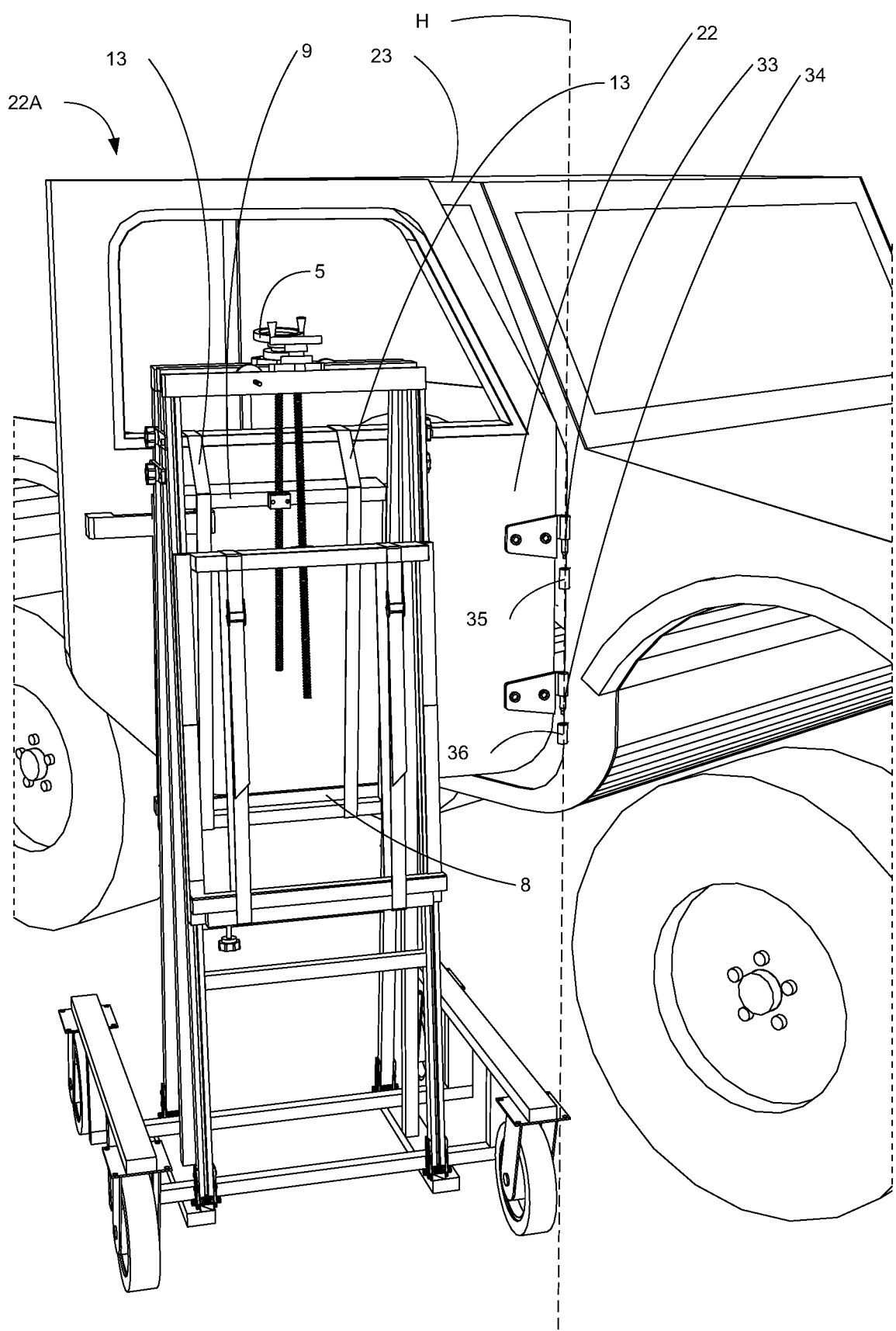
FIG. 22 illustrates the fully secured door lifted off its hinges, removing the door from the vehicle.
Figure 23:
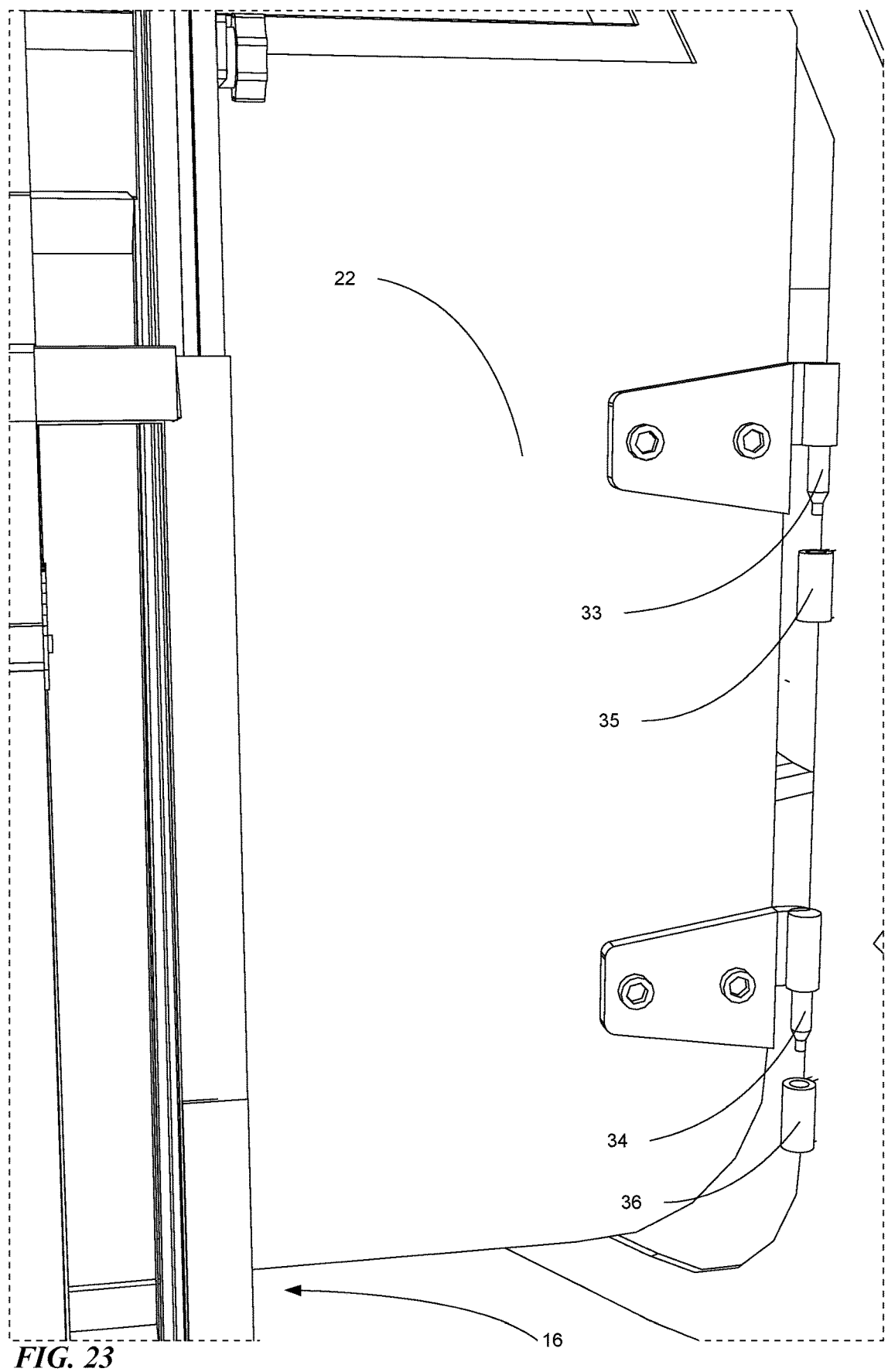
FIG. 23 illustrates a zoomed view of the fully secured door lifted off its hinges, removing the door from the vehicle.

FIGS. 10-31 illustrate the implementation of the door system 16, removing and storing the driver's 22B and passenger's 22A doors from a 2-door vehicle. FIG. 10 illustrates the door system 16 at it is first approaching the opened passenger door 22A. FIG. 10 further illustrates the orientation of the door system 16 to that of the painted surface of the vehicle's passenger door 22A, FIGS. 11-13 illustrate the door system 16 in its nearest most location to the vehicle's passenger door 22A without the passenger door being secured to the device 16 nor lifted. FIGS. 11-13 also illustrate the orientation of the passenger doors interior surface 24 on the opposite side of the device. FIG. 14 illustrates the door system's 16 controls used to begin alignment to the vehicle's passenger door 27. Firstly, the height of the lower door rest 8 must be adjusted by rotating the crank handle 5 to raise or lower the lower door rest 8. The initially vertical location of the lower door rest 8 must be below the bottom edge of the door by approximately 0.25 inches as illustrated by reference 25 (see FIG. 15). This adjustment is accommodated by rotating the crank handle 5. FIG. 16 is a zoomed representation of this initial vertical distance at reference number 25. Once the lower door rest 8 is approximately 0.25 inches below the passenger door's lower edge 22A, the door system can be moved up against the passenger door's painted surface 22. This places the lower door rest 8 under the passenger door's 22A lower edge, readying the lift to engage the door for lifting. FIG. 16 also demonstrates the difference of the angle of the lower door edge 27 to that of the lower door rest 8. The distance at 26 is greater than the distance at 25, creating an unparallel relationship between the lower door edge 27 and the lower door rest 8. This is possible due to the uneven surfaces in which both the device 16 and the vehicle reside upon, the angle at which the vehicle's 23 chassis/suspension is resting when parked or a combination of both. For the door system 16 to perform properly, this angle must be adjusted to match that of the vehicle's lower door edge 27. To correct this angle, the lower door rest 8 must first be raised such that the protective felt strip 8A is touching the lower door edge (see 28 in FIG. 17). This is accomplished by rotating the crank handle 5 clockwise. The jack screw then 6 rotates within the jack screw nut 6B, raising the upper door rest 9, the vertical posts 8B and finally the lower door rest 8. Once the protective felt strip 8A has contacted one side of the lower door edge 27, the angle of the lower door rest 8 can be adjusted to match that of the lower door edge 27 using the lower door rest adjustment knob 7 (see 30 in FIG. 18). Additionally, for the illustrated embodiments to perform properly, the angle of the upper door rest 9 must also match the angle of the door's painted surface 22. In FIG. 19, reference number 31 illustrates the gap between the door's painted surface 22 and the upper door rest's padded surface 9A. To correct this, locking knobs 12, on each side of the side frame sections must be loosened to free up the locking brackets 12A. Then, by turning the upper door rest adjustment knob 15 clockwise, the jack screw 15A rotates within the jack screw nut 15B located within the upper horizontal member 67, forcing the upper door rest to move towards the painted surface of the door. FIG. 20 illustrates the upper door rest 9 properly adjusted, with the upper door rest's padded surface 9A touching the door's painted surface 22. Reference number 32 illustrates the properly adjusted upper door rest 9. Locking knobs 12, on each side, are now tightened to stabilize the final tilt adjustment. With the angles of the upper 9 and lower door rests 8 fully adjusted and locked, matching the angles of the doors painted surface 22 and lower edge 27, the lashing straps 13 (see FIG. 21) can now be attached to fully secure the door 22A to the lift. FIG. 22 further illustrates the attachment of the lashing straps 13 as they secure the door 22A to the upper 9 and lower door rests 8. FIGS. 22 and 23 illustrate the door 22A lifted from the vehicle's upper and lower hinge pin mounts 35, 36, respectively, after rotating the crank handle 5 clockwise the appropriate number of revolutions. Reference number 33 illustrates the door's upper hinge pin. Reference number 34 illustrates the door's lower hinge pin. It will be understood that the ability to finely adjust the lower door rest 8 and upper door rest 9 allows the hinge pins 33, 34 to be aligned with the hinge axis H (FIG. 22) extending through hinge pin mounts 35, 36, thereby allowing the hinge pins to "float" in the hinge pin mounts.

Figure 24:
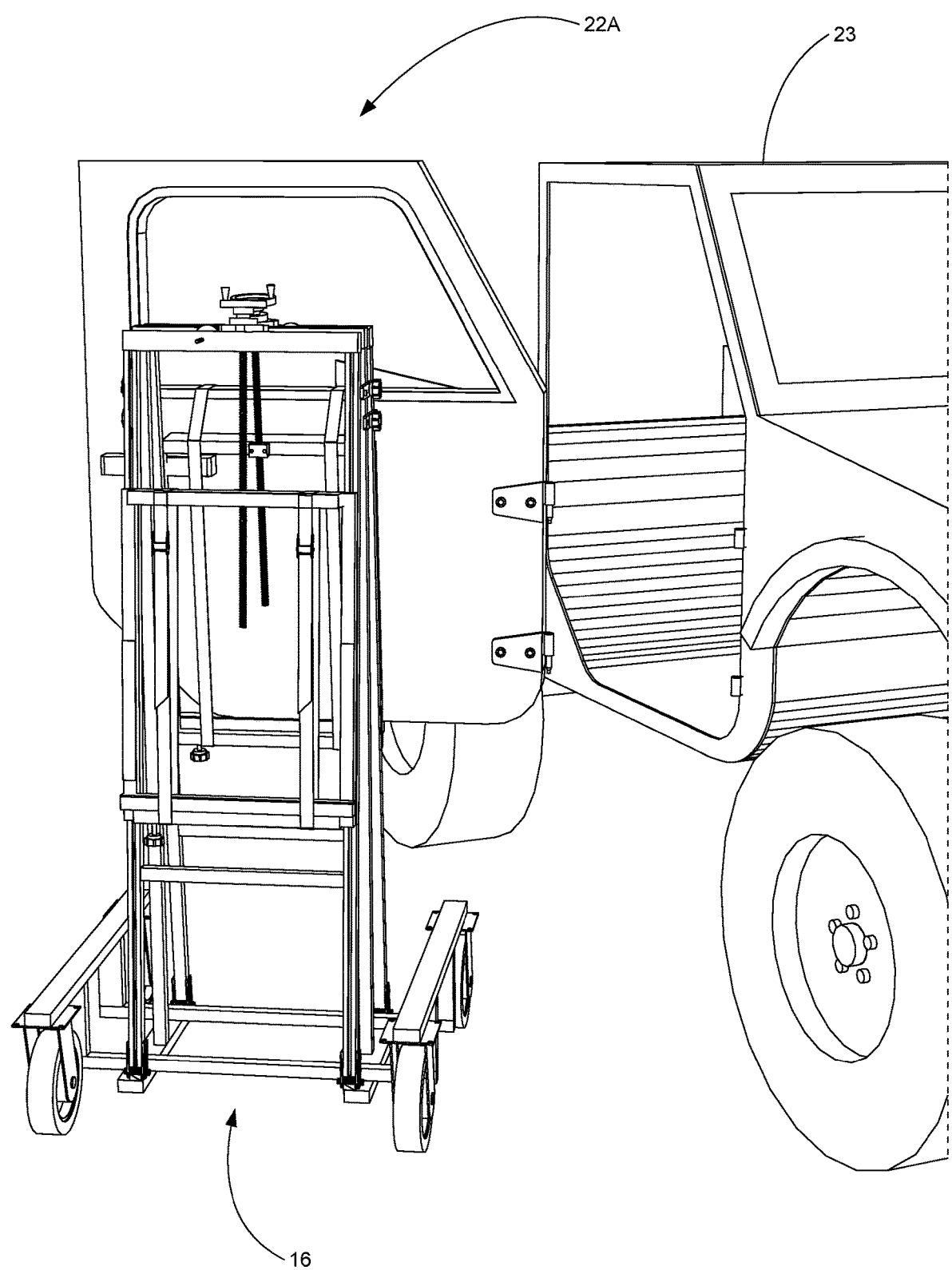
FIG. 24 illustrates the fully secured door lifted off its hinges removing the door from the vehicle, with the device rolled away from the vehicle, in preparation to move to the other side of the vehicle to remove the driver's side (LEFT) door.
Figure 25:
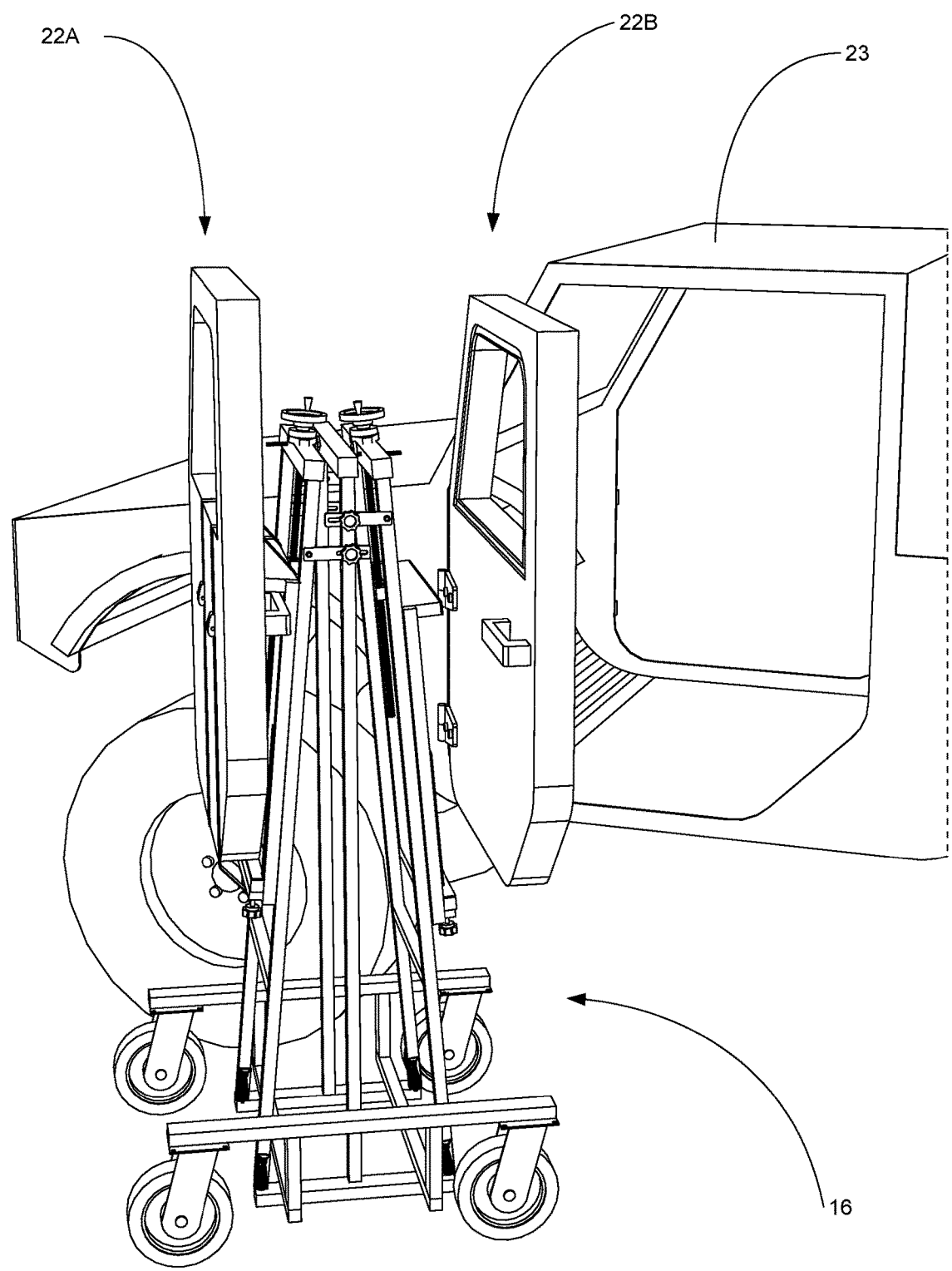
FIG. 25 illustrates the device with the passenger door securely stored on the device as it approaches the driver's side door for removal.
Figure 26:
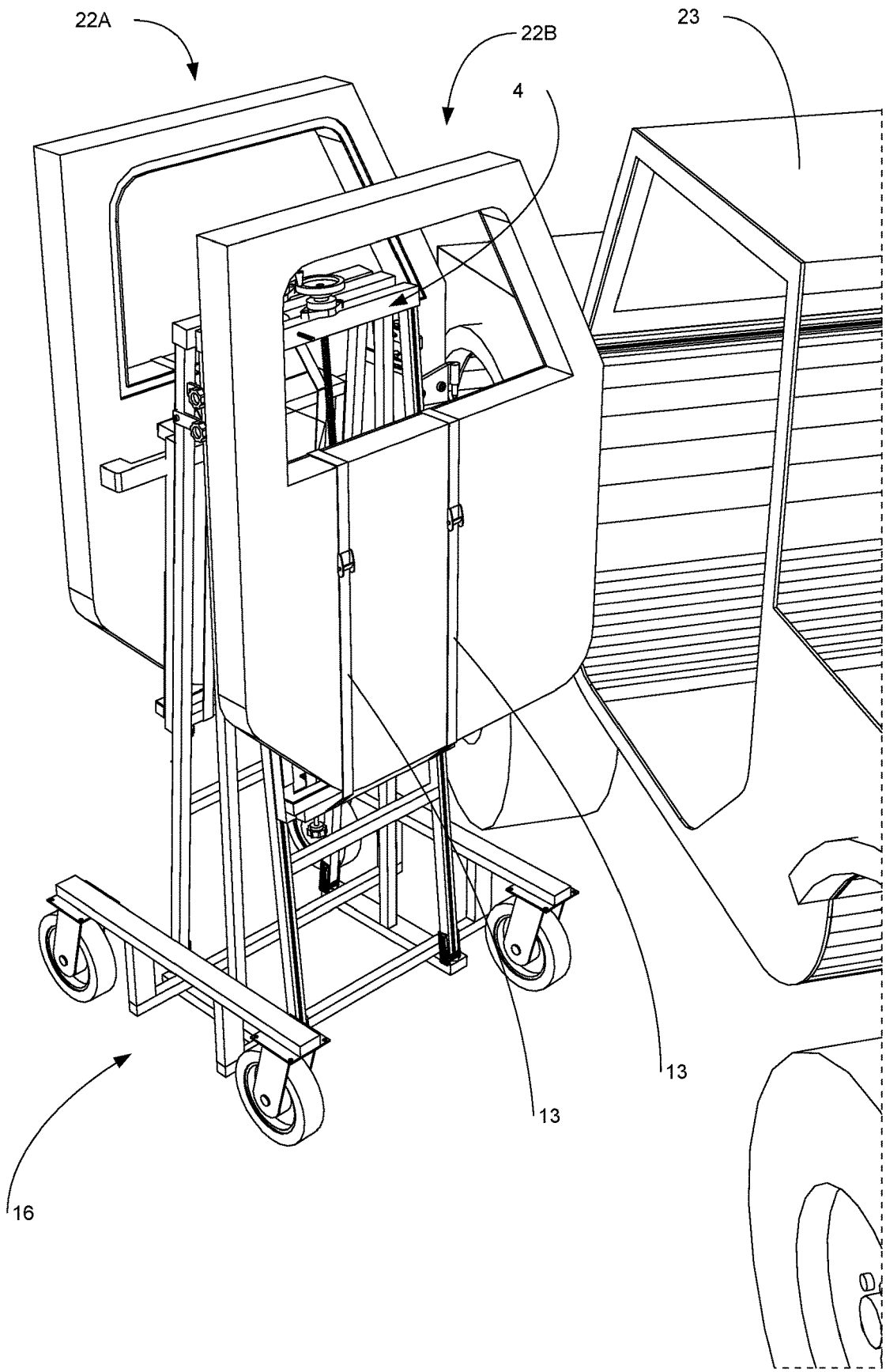
FIG. 26 illustrates the device with the lift for driver's side door fully adjusted and strapped to the device, ready for removal.
Figure 27:
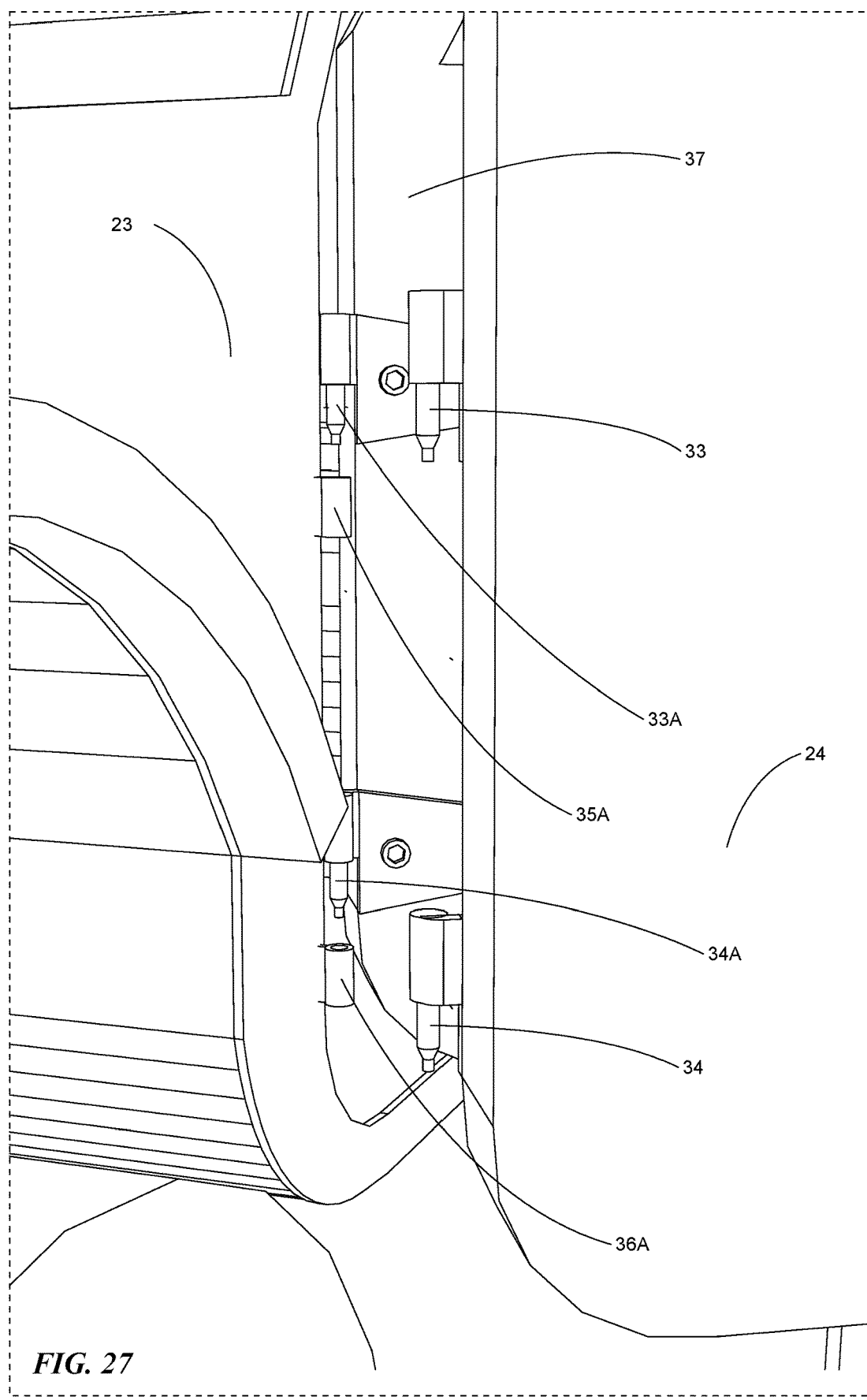
FIG. 27 illustrates a zoomed view of the driver's side door lifted from its hinges mounts on the vehicle.
Figure 28:
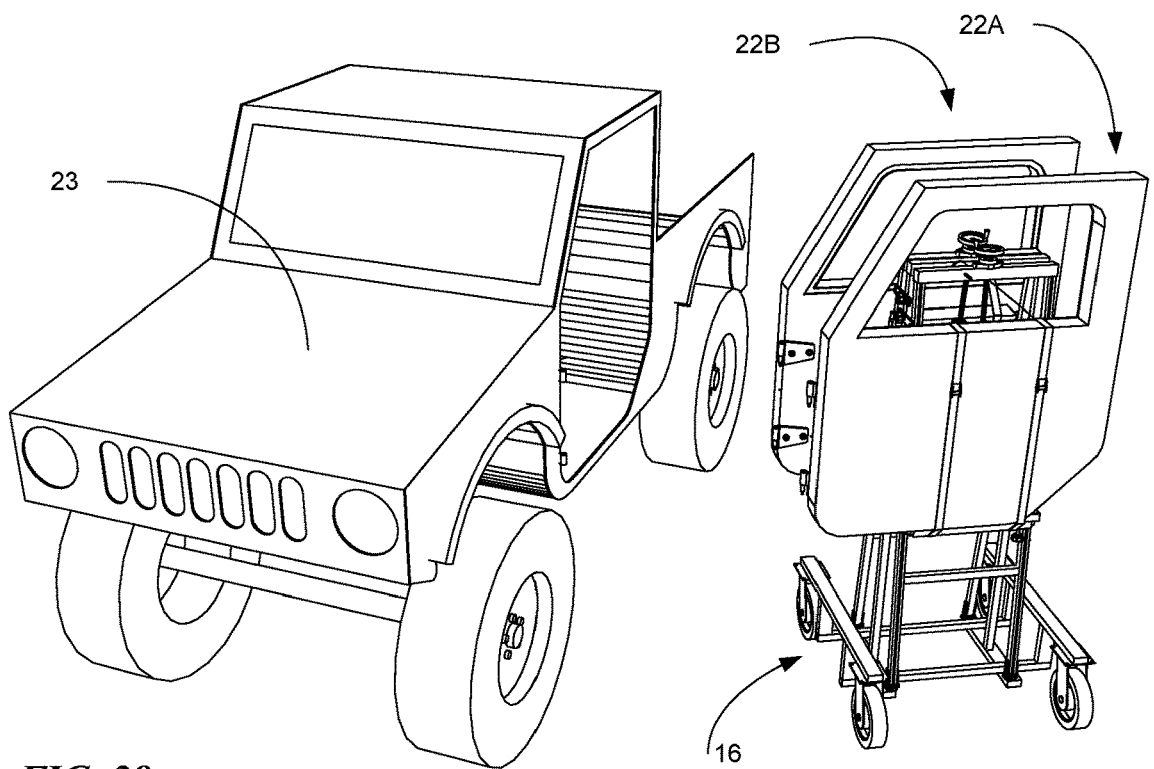
FIG. 28 illustrates a perspective view of both doors removed and securely stored on the device.
Figure 29:
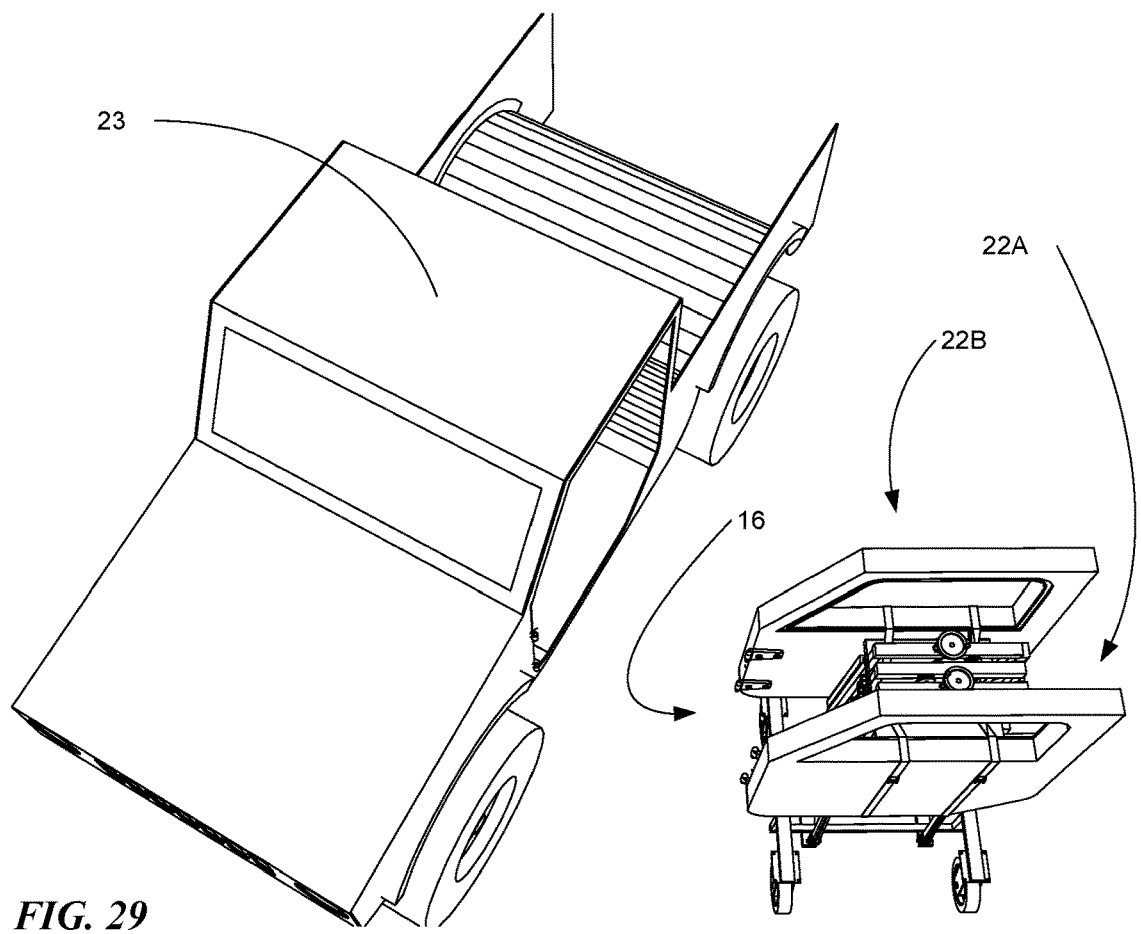
FIG. 29 illustrates a top view of both doors removed and securely stored on the device.
Figure 31:
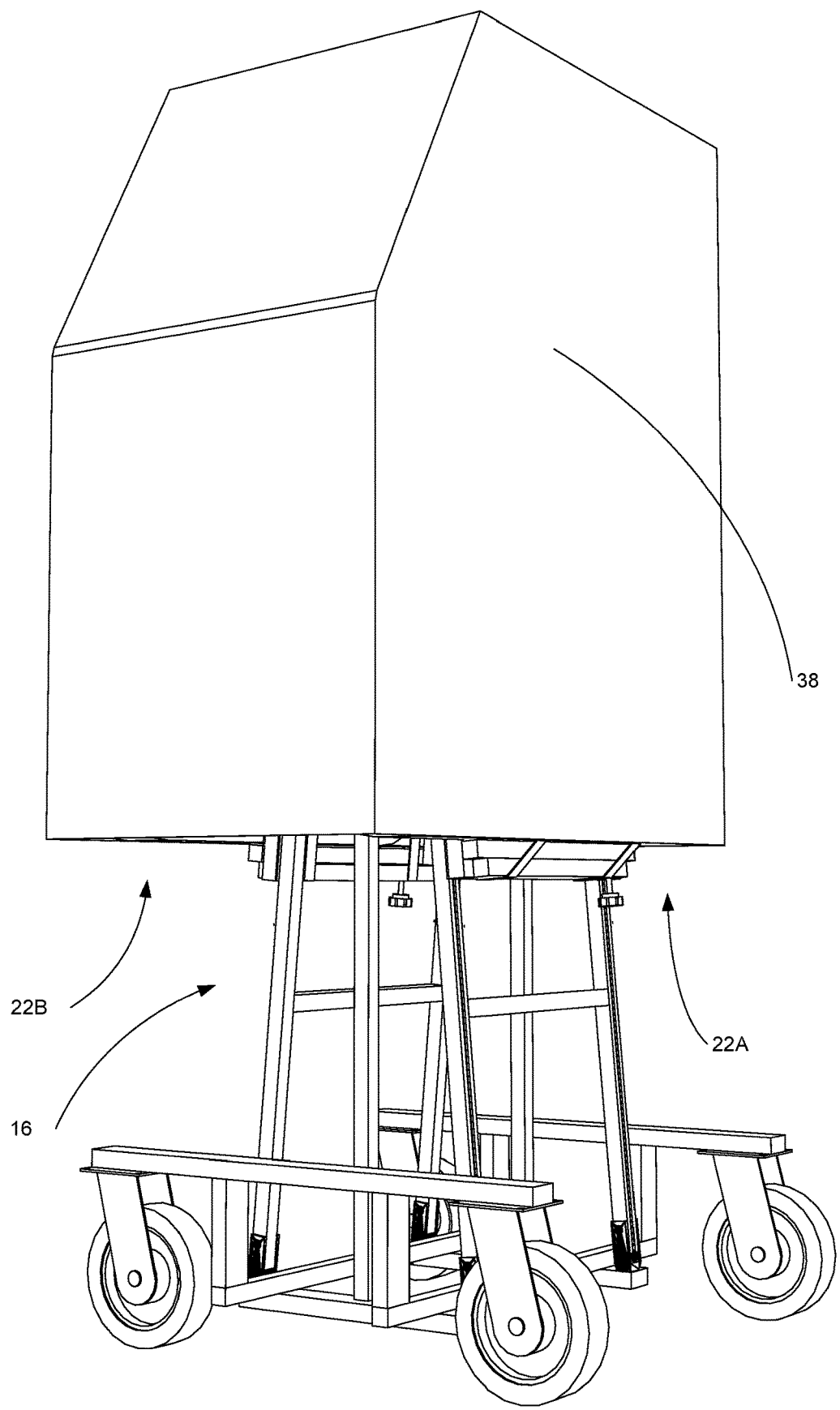
FIG. 31 illustrates the both doors securely stored on the present disclosure, with the present disclosure moved away from the vehicle, while using an optional cover for storing the doors outdoors when a garage or covered parking is not available (apartment, condo, etc.).

To lift the door 22A from the vehicle's hinge pin mounts 35 and 36, crank handle 5 is rotated clockwise until the door's hinge pins 33 and 34 are fully lifted out of the vehicle's hinge pin mounts 35 and 36. FIG. 24 illustrates the vehicle's passenger door 22A removed from the vehicle 23. With the passenger door 22A removed, the door system 16 is now moved to the driver's side to repeat the above-mentioned steps to remove the driver's side door 22B. This process begins with FIG. 25, with the door system 16 approaching the open, driver's side door 22B with the passenger door 22A securely attached, in storage mode. FIG. 26 illustrates the driver's side door 22B strapped with the lashing straps 13 to the driver's side lift after having its lower and upper door rests 8, 9 properly adjusted, as previously mentioned for the passenger side door 22A. FIG. 27 illustrates the driver's side door hinge pins 33A and 34A lifted from the vehicle's upper and lower hinge pin mounts 35A and 36k FIGS. 28 and 29 illustrate passenger and driver's side doors 22A and 22B securely strapped to the door system 16 and removed from the vehicle 23. FIG. 30 illustrates the passenger and driver's doors 22A and 22B stored on the door system 16. FIG. 31 illustrates the doors stored outside with an optional weatherproof cover 38; very useful for users who do not have covered storage available to place their stored doors, such as apartments, condos, etc.

Figure 32:
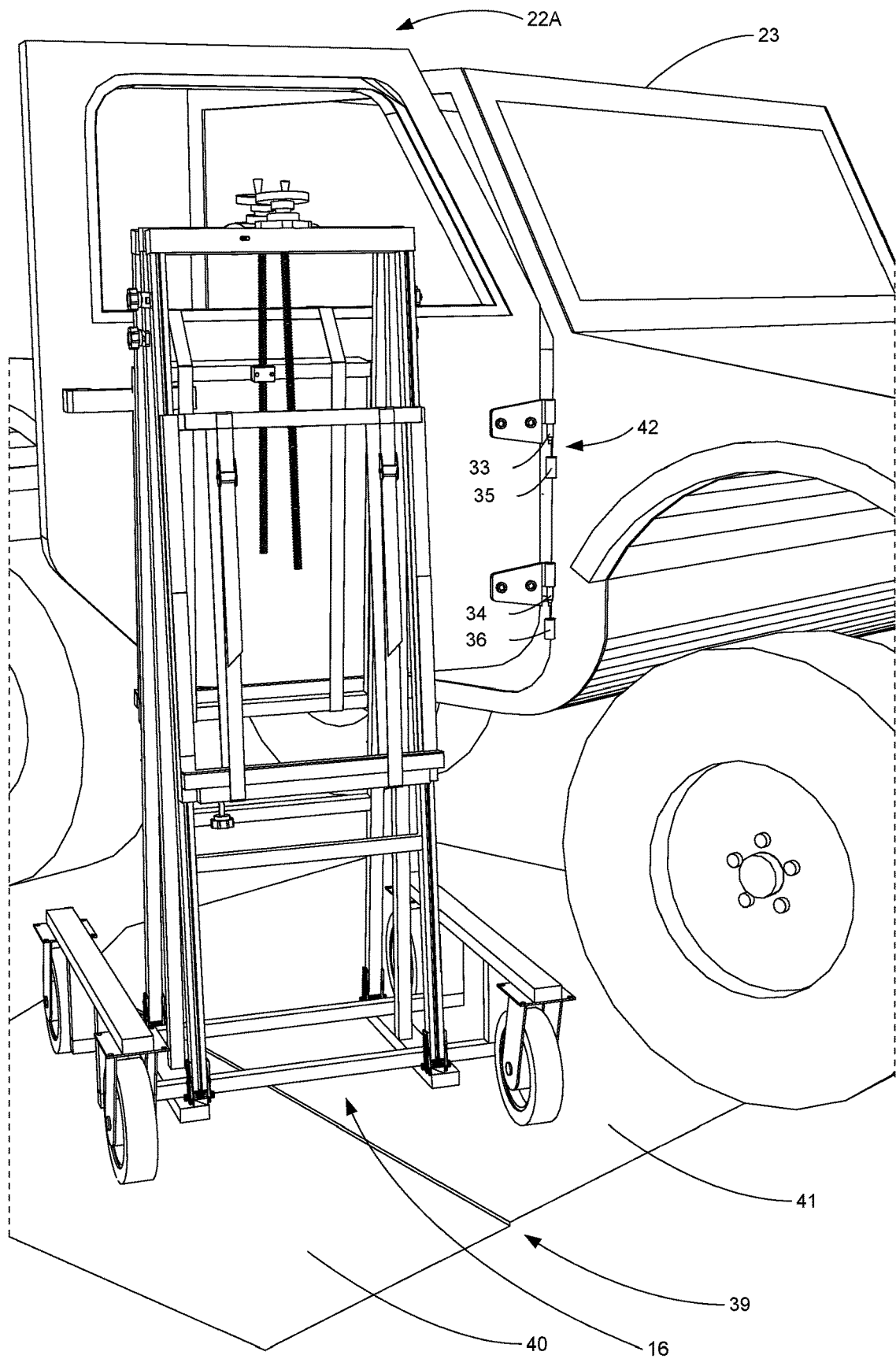
FIG. 32 illustrates the present disclosure with the passenger door securely stored on it, in preparation to for re-installation back onto the vehicle. The vehicle has now parked in a different location from where the door was removed. This new location has a crack in the pavement under the present disclosure. The pavement is lower on the side furthest away from the vehicle. This causes a misalignment of the doors hinge pins to the vehicle's hinge mounts.
Figure 33:
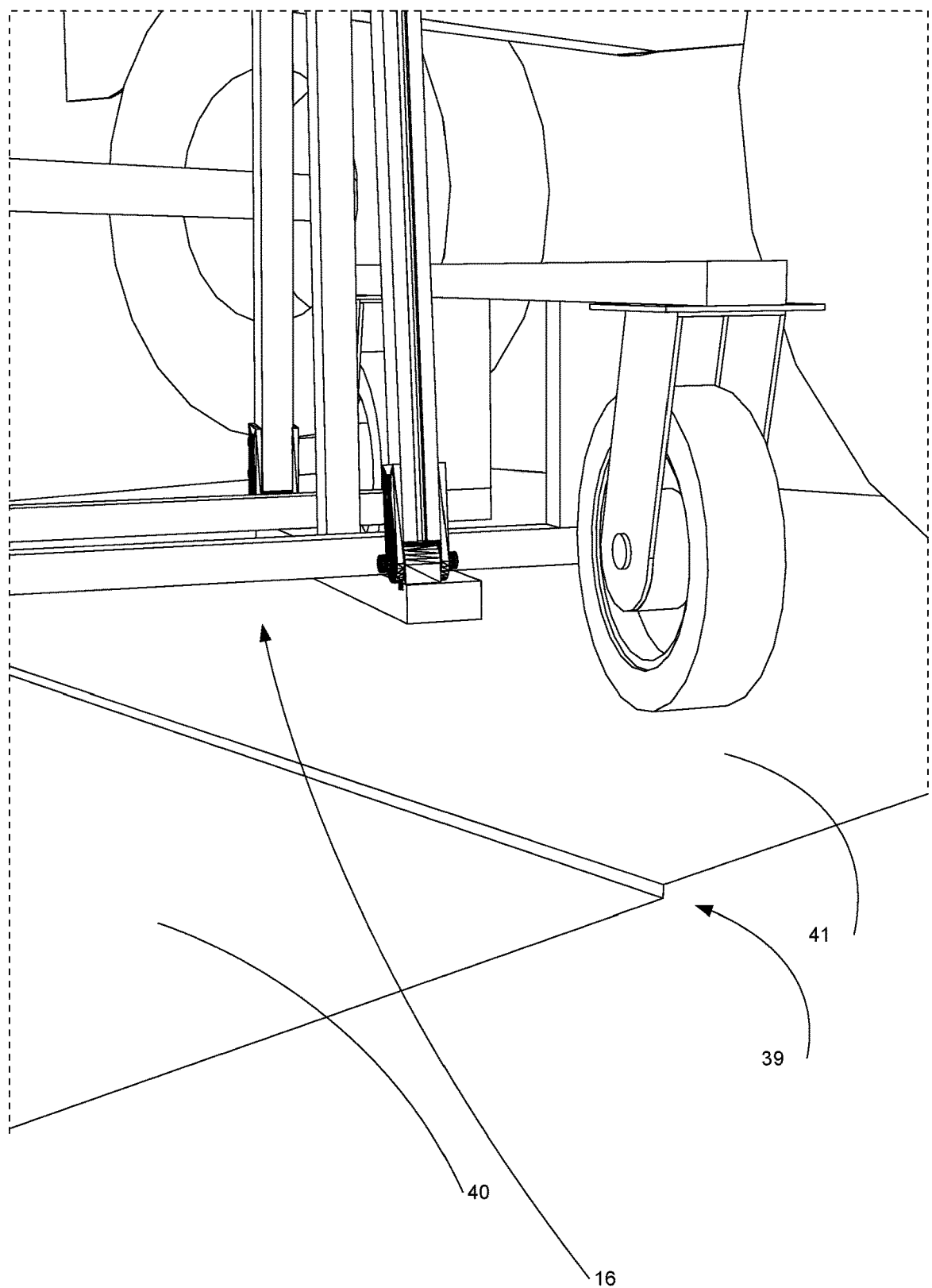
FIG. 33 illustrates a zoomed view of the crack in the surface just under the present disclosure, noting the lower surface furthest away from the vehicle, causing the present disclosure to tilt, further causing misalignment of the door's hinge pins to the vehicle's hinge mounts.
Figure 34:
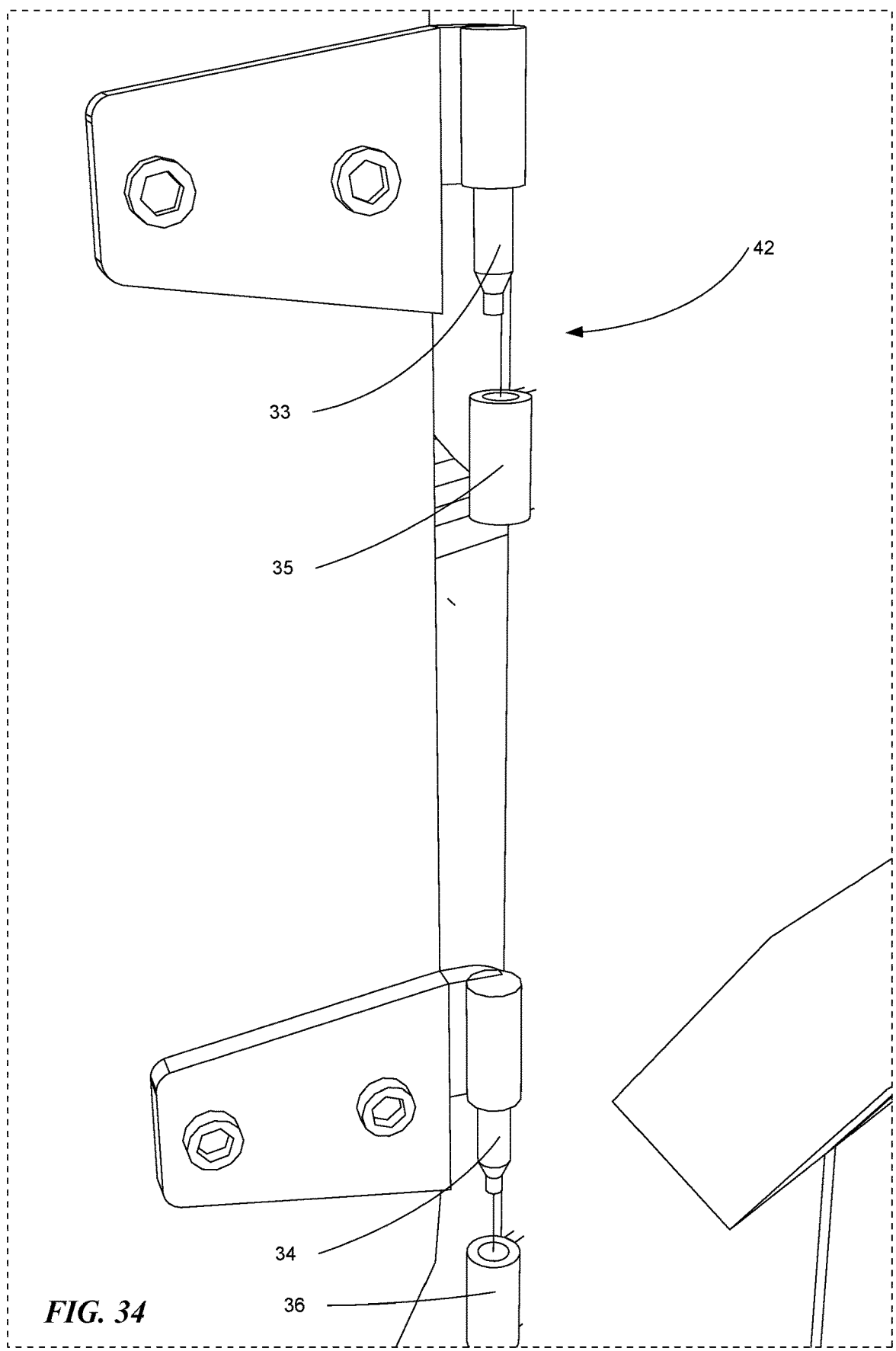
FIG. 34 illustrates a zoomed view of the misalignment of the door's upper hinge pin to its hinge mount, due to the angled presentation of the present disclosure as a result of the cracked/uneven pavement.
Figure 35:
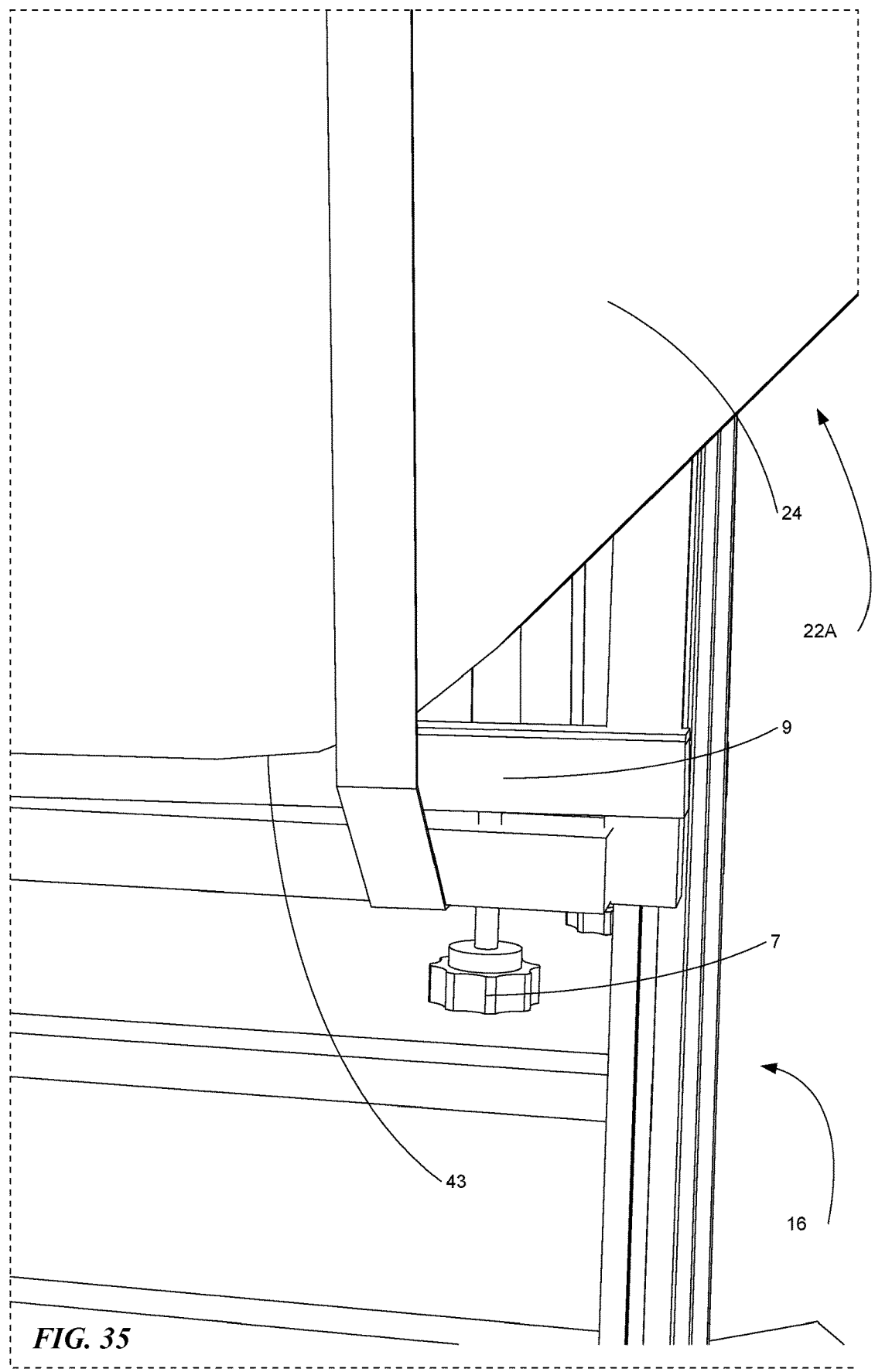
FIG. 35 illustrates a zoomed view of the present disclosure's adjustment knob used to adjust the door's alignment angle to match that of the vehicle's hinge mounts.
Figure 36:
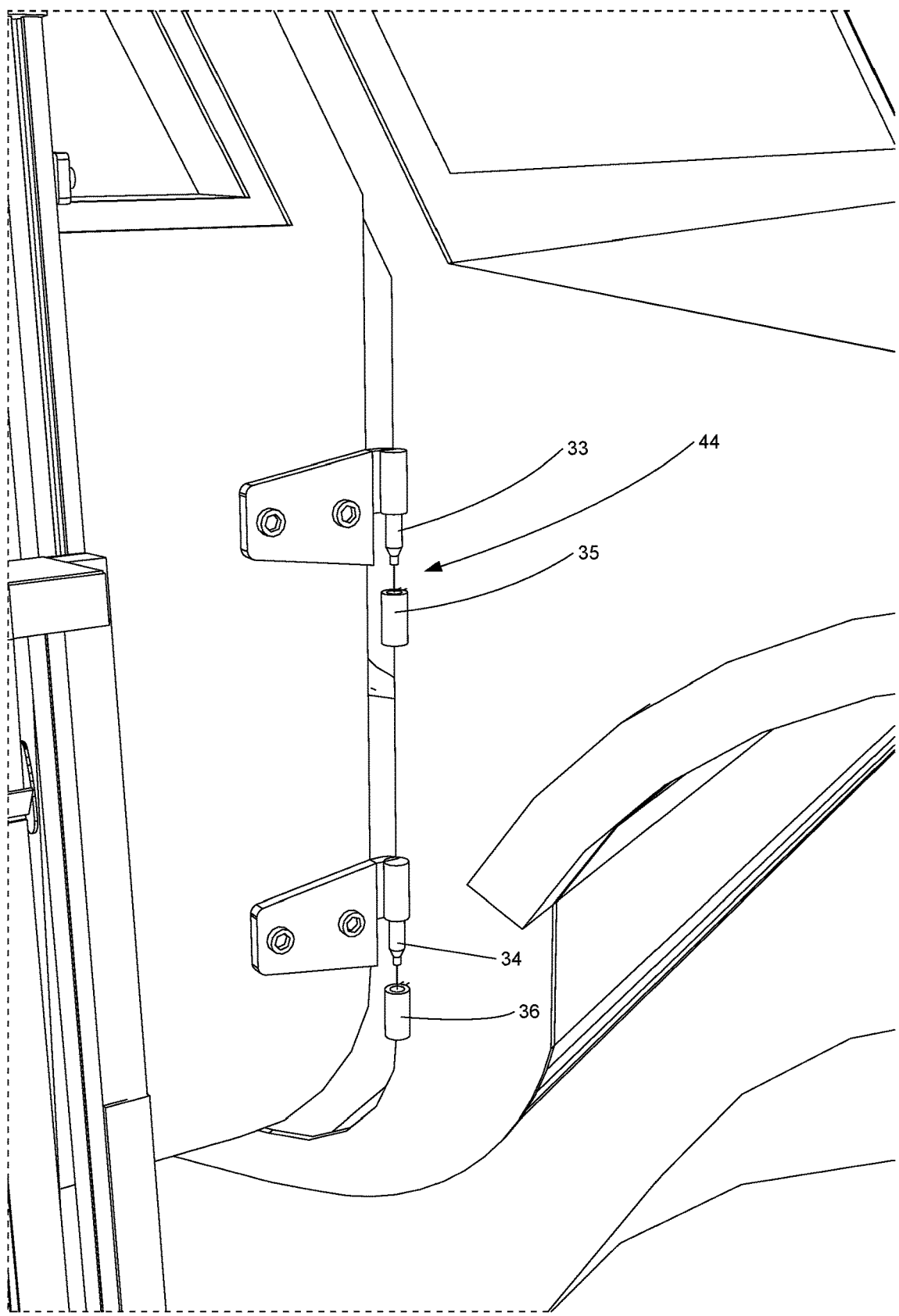
Figure 37:
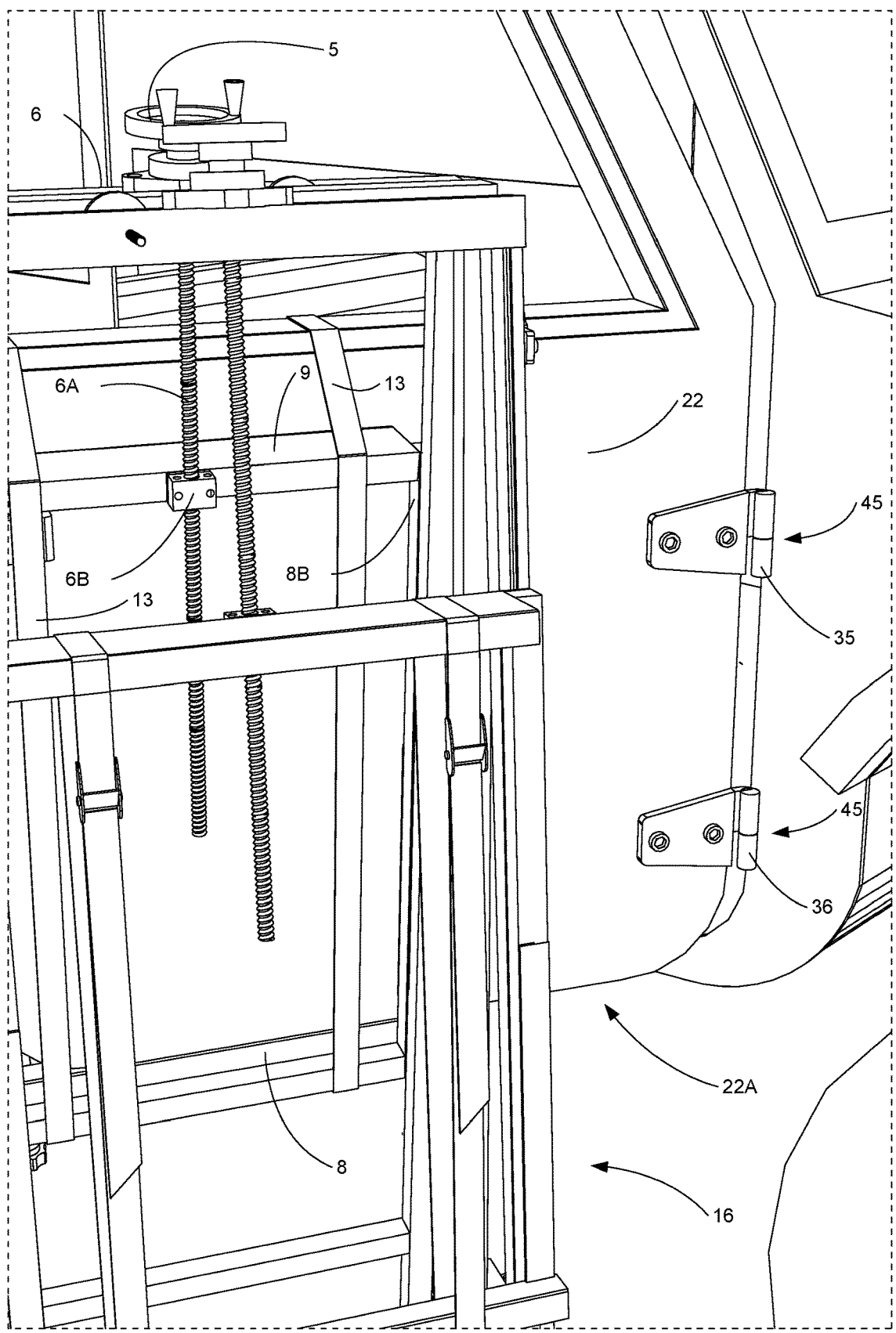
FIG. 37 illustrates a view of the passenger door's hinge pins lowered back into their hinge mounts.
Figure 38:
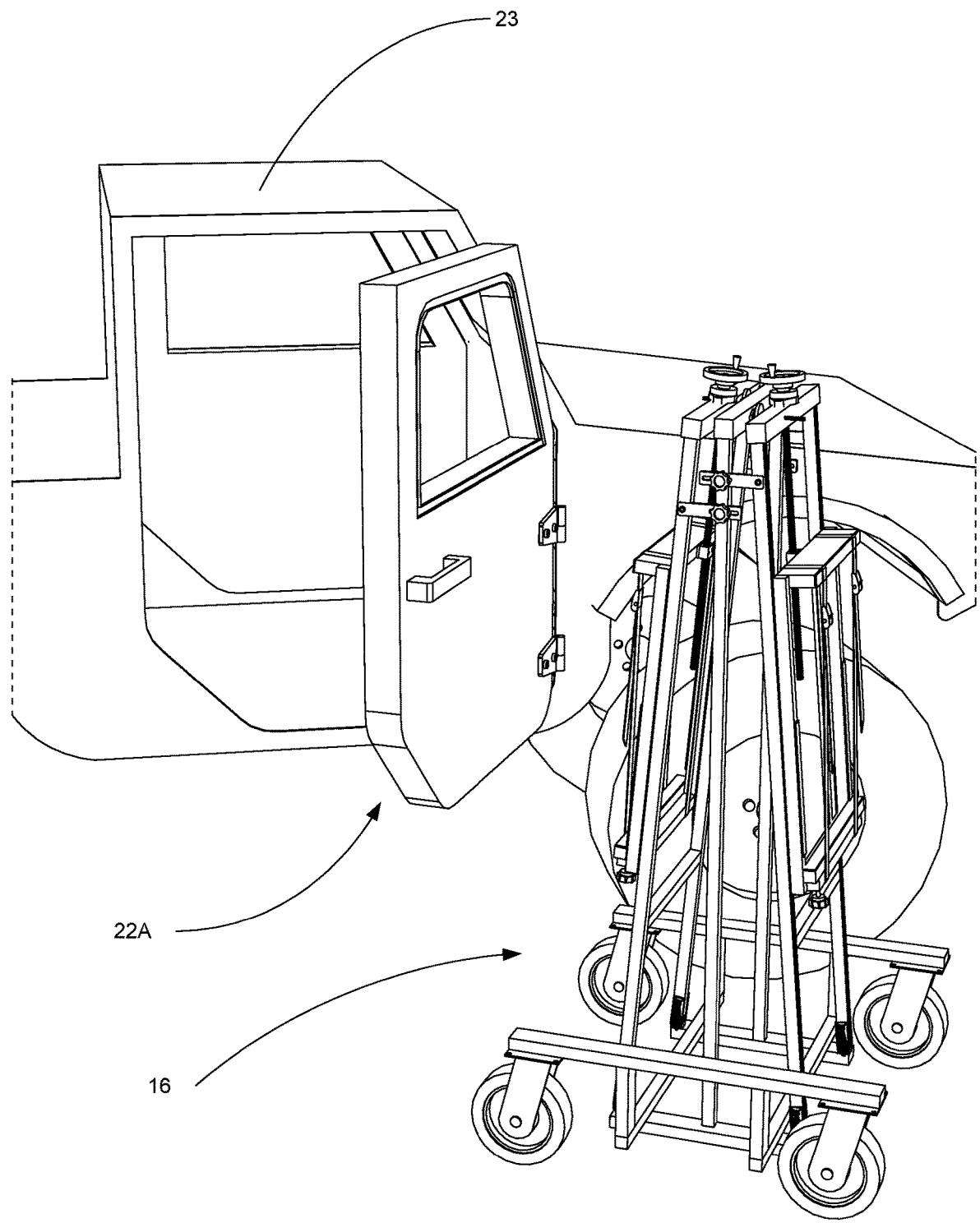
FIG. 38 illustrates a view of the passenger door re-installed and the present disclosure ready for storage until next use to remove the doors.

FIGS. 31-38 illustrate the door system 16 re-installing the passenger side door 22A. This includes illustrating the door system's ability to maintain precise alignment of the door's hinge pins 33 and 34 to the vehicles hinge mounts 35 and 36 when the surface that the door system is at a different angle to that of the vehicle from when the doors were removed. This maintains safe re-installation to both the user and the vehicle's painted surfaces and hinge hardware. FIG. 32 illustrates the door system 16 next to the vehicle 23, to re-install the passenger side door 22A. Reference number 39 illustrates a crack or deviation in the pavement in which the vehicle 23 is parked and the door system 16 rests. The crack runs through the middle of the door system 16, making the side furthest from the vehicle 40 lower than the side closest to the vehicle 41. This height difference in the surface under the door system 16 causes it to be tilted at an angle. This different angle now creates an alignment problem for the door's upper hinge pin 33 to its hinge mount 35. Reference number 42 (in FIG. 34) shows the misalignment of hinge pin 33 to hinge mount 35. Attempting to lower the door down back onto its hinge mounts 35 and 36 without adjusting for this difference in the surface height will be unsuccessful getting both hinge pins 33 and 34 back in. Upper hinge pin 33 will miss its hinge mount 35. FIG. 33 illustrates a zoomed view of the crack/deviation in the pavement 39, with the surface at 40 lower than the surface as 41. FIG. 34 illustrates a zoomed image of the misaligned top hinge pin 33 to its hinge mount 35 at reference number 42. To align the upper hinge pin 33, the tilt of the door 22A must be adjusted. This adjustment is easily accommodated using the lower door rest adjustment knob 7 (see FIG. 35). Rotating the lower door rest adjustment knob 7 clockwise will raise the outer end of the lower door rest 8, raising the outer edge 43 of the passenger door 22A. By raising the outer edge of the passenger door 22A, the upper hinge pin 33 will also rotate inward, allowing it to align with the upper hinge mount 35, as illustrated at reference number 44 (see FIG. 36). With both the upper and lower hinge pins 33 and 34 aligned with their respective hinge mounts 35 and 36, the passenger door 22A can now be lowered back down, re-installing it back onto the vehicle 23. To lower the passenger door down, crank handle 5 is rotated counterclockwise. By rotating the crank handle 5, the jack screw 6 rotates through the upper lift rail 6A, acting upon the jack screw nut 6B. This will cause the jack screw nut 6B to lower. The jack screw nut 6B is attached to the upper door rest 9. Upper door rest 9 attaches to vertical posts 8B, which attach, at the bottom, to the lower door rest 8. The passenger door 22A is securely fastened to the upper and lower door rests 9 and 8 respectively, with the lashing straps 13. Therefore, rotating the crank handle 5 counterclockwise will lower the passenger door 22A. The passenger door 22A is considered re-installed once the hinge pins 33 and 34 are fully seated in their respective hinge mounts 35 and 36 as illustrated by reference number 45 (see FIG. 37). With the passenger door 22A re-installed lashing straps 13 can be removed, the lower door rest 8 can be lowered another 0.25 inches by rotating crank handle 5 counterclockwise. This will fully decouple the door system 16 from the passenger door 22A. FIG. 38 illustrates the door system 16 in its unused, stored state, with lashing straps 13 re-secured to the upper and lower door rests, 9 and 8 respectively and moved away from the vehicle 23.

Figure 39:
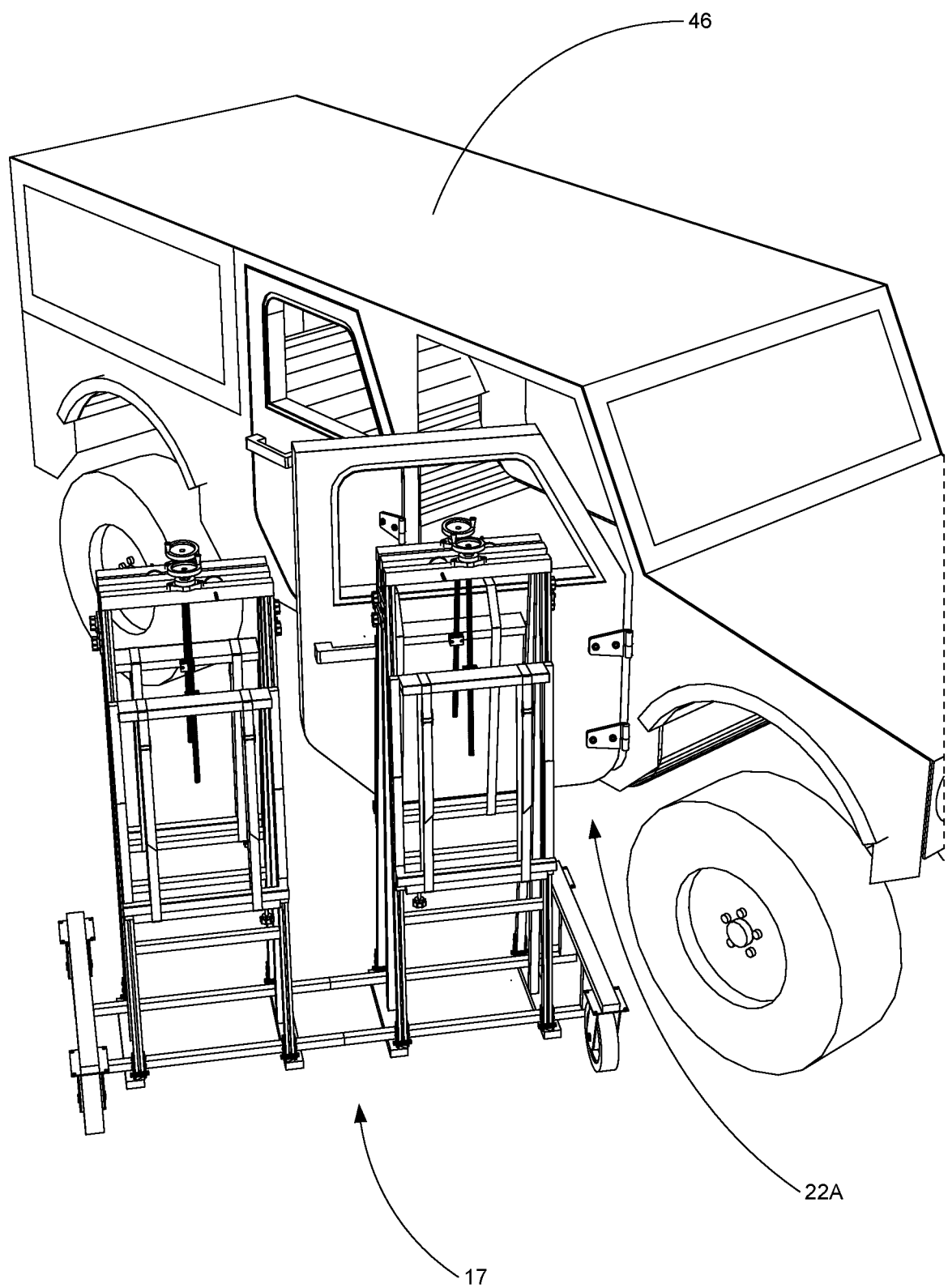
FIG. 39 illustrates the passenger, front door attached, but not lifted, on the 4-door version of the present disclosure.
Figure 40:
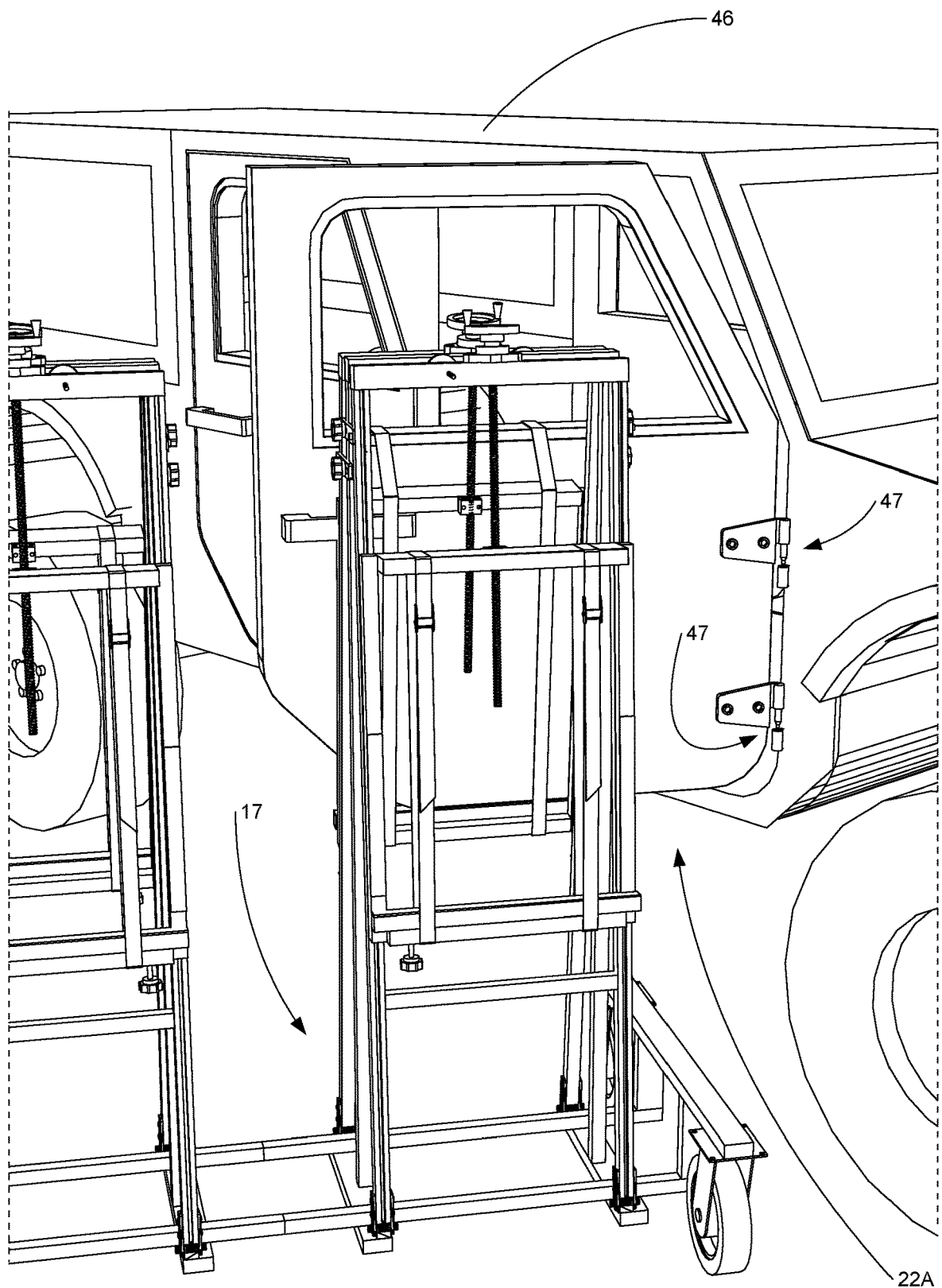
FIG. 40 illustrates the passenger, front door secured to the present disclosure and lifted from the 4-door vehicle.
Figure 41:
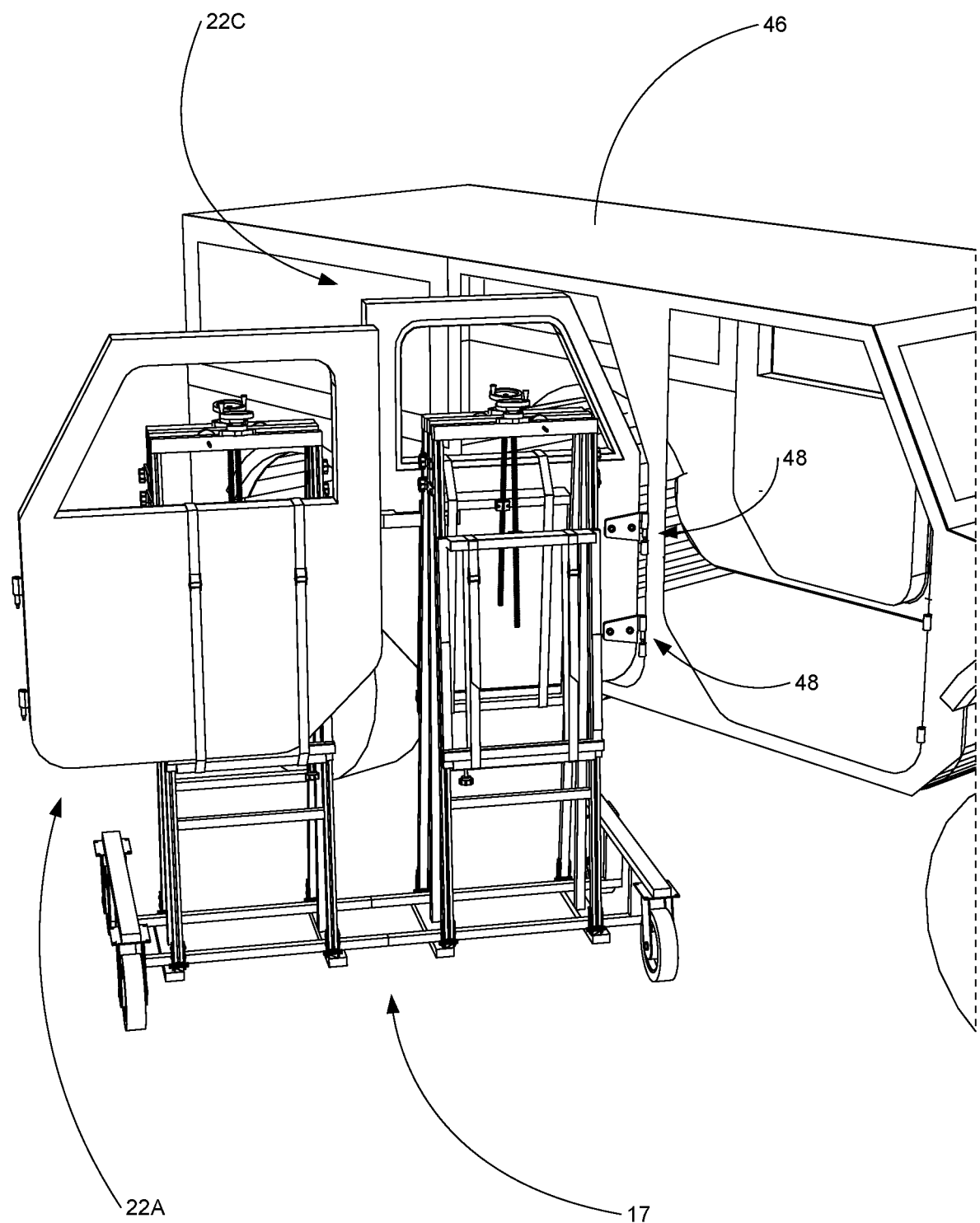
FIG. 41 illustrates the passenger, rear door secured to the present disclosure and lifted from the 4-door vehicle.
Figure 42:
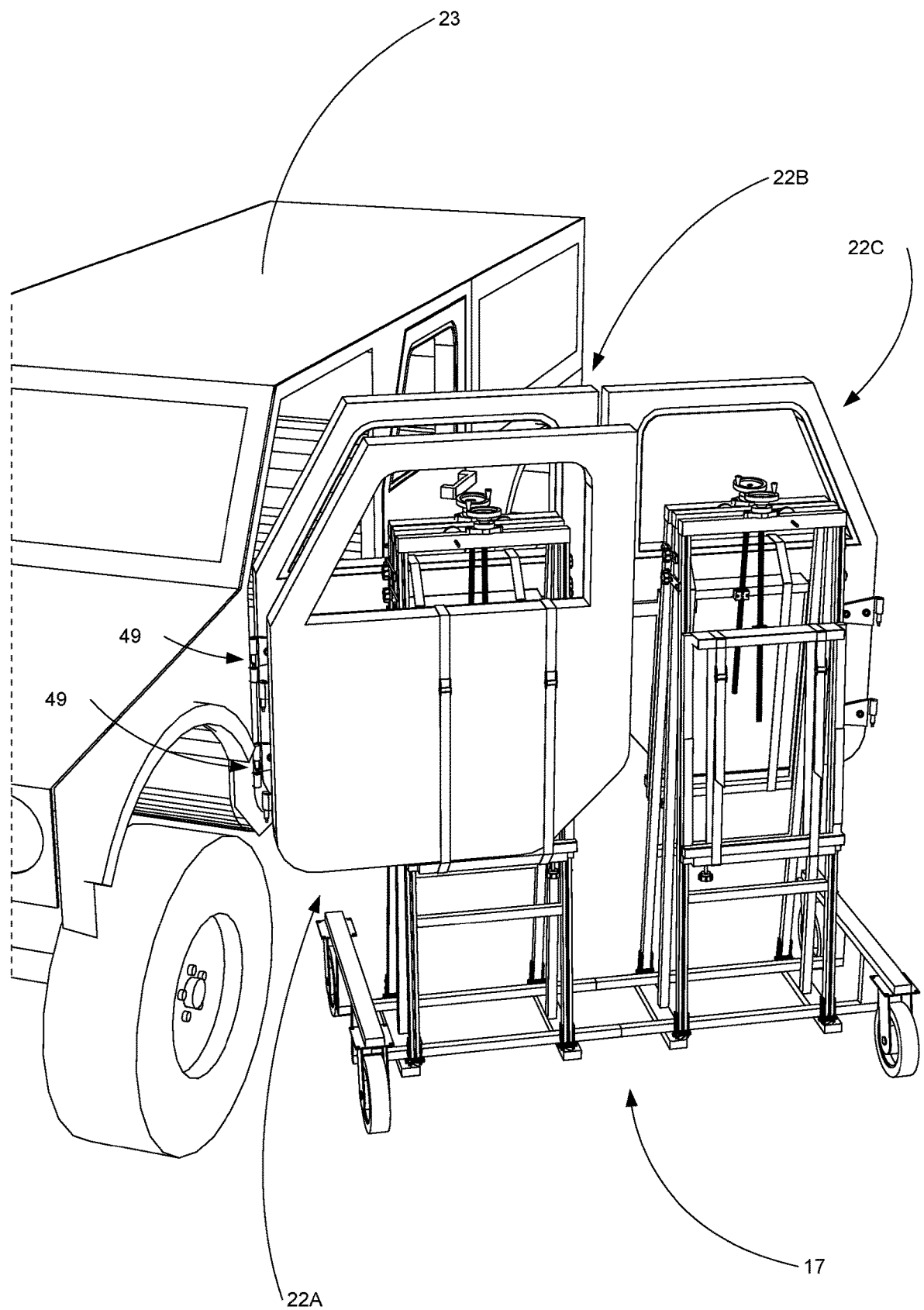
FIG. 42 illustrates the driver, front door secured to the present disclosure and lifted from the 4-door vehicle.
Figure 43:
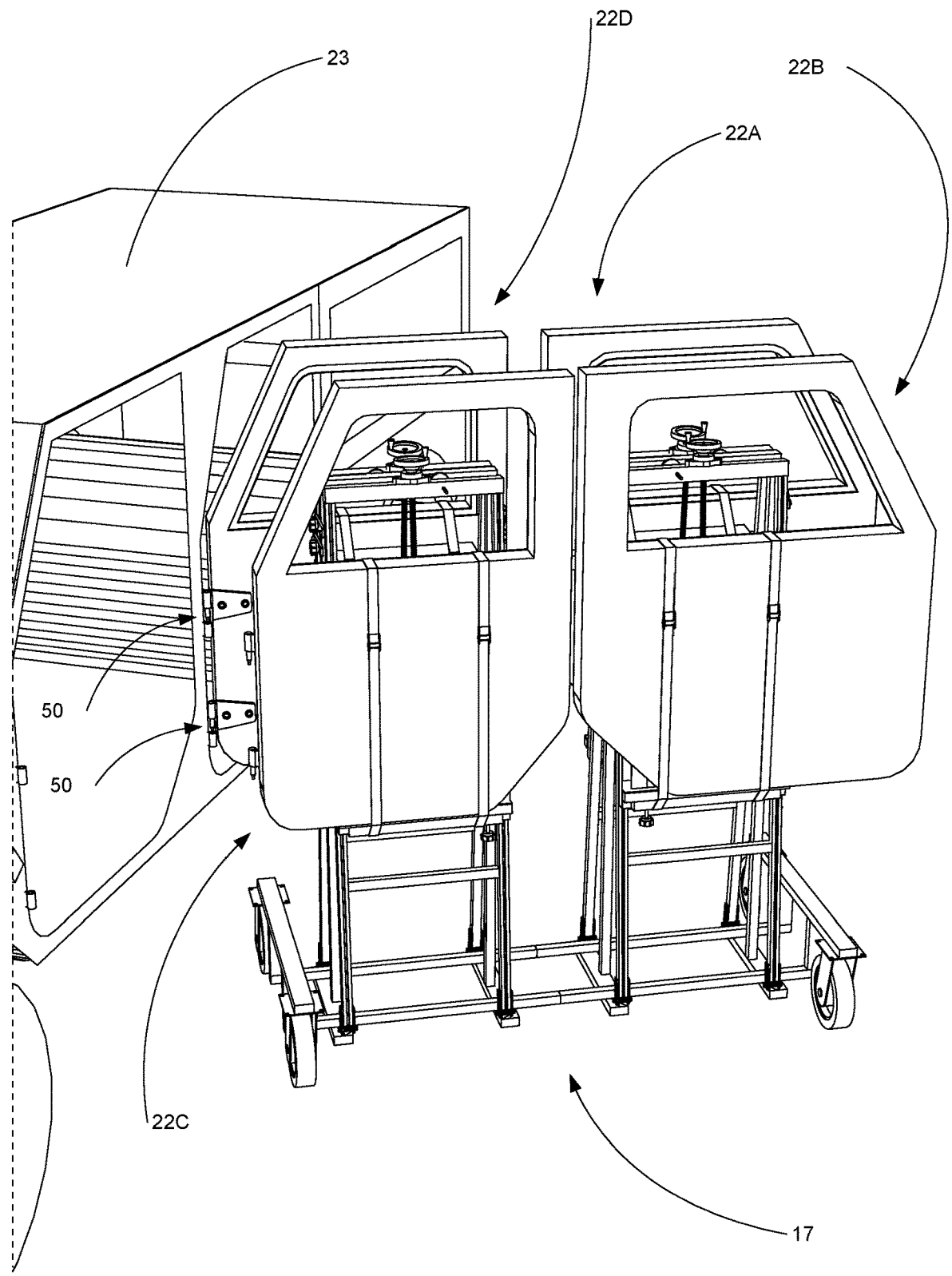
FIG. 43 illustrates the driver, rear door secured to the present disclosure and lifted from the 4-door vehicle.

FIGS. 39-44 illustrate the 4-door version of the door system 17 acquiring and lifting each of the 4 doors off of the 4-door vehicle 46. FIG. 39 illustrates the door system 17 attached to the passenger side, front door 22A, but not lifted. FIG. 40 illustrates the passenger, front door 22A, lifted off the vehicle 46 and stored on the door system 17. Reference number 47 illustrates the that the door's hinge pins have been lifted from their hinge mounts. FIG. 41 illustrates the door system 17, rotated 180 degrees and with the passenger, rear door 22C removed from the vehicle 46 and stored on the door system 17. FIG. 41 also illustrates the passenger, front door 22A still securely stored on the door system 17. FIG. 42 illustrates the door system 17 moved to the driver's side of the vehicle with the passenger side's front and rear doors 22A and 22C respectively securely door on the door system 17. FIG. 42 also illustrates the driver's front door 22B lifted off the vehicle and securely stored on the door system 17. FIG. 43 illustrates all 4 doors 22A, 22B, 22C and 22D lifted off the vehicle and securely stored on the door system 17. FIG. 44 illustrates the door system 17, with all 4 doors 22A, 22B, 22C and 22D securely stored and placed away from the vehicle in a storage location.

PARTS LIST

1. Wheel
2. Base Frame
2A. Lower Horizontal Base Frame Member
2B. Lower Vertical Base Frame Member
2C. Upper Horizontal Base Frame Member
3. Passenger Side Lift, 2-Door System
4. Driver Side Lift, 2-Door System
5. Crank Handle
5A. Bearing Assembly
6. Jack Screw
6B. Jack Screw Nut
7. Lower Door Rest Adjust Knob
7A. Lower Door Rest Adjust Jack Screw
7B. Guide Pin
7C. Lower Door Rest Hinge
8. Lower Door Rest
8A. Lower Door Rest Protective Felt Strip
8B. Vertical Frame Members
8C. Vertical Posts Protective Felt Strips
8D, Lower Frame Member
9. Upper Frame Member (Upper Door Rest)
9A. Upper Door Rest Protective Felt Strip
10. Driver Side Upper Door Rest Adjustment Knob
10A. Driver Side Upper Door Rest Adjustment Jack Screw
11. Driver Side Upper Door Rest Locking Knob
11A. Driver Side Upper Door Rest Locking Knob Bracket
12. Passenger Side Upper Door Rest Locking Knob
12A. Passenger Side Upper Door Rest Locking Knob Bracket
13. Lashing Strap
14. Channels
14A. Nylon T-Slot Bearing Material
15. Passenger Side Upper Door Rest Adjustment Knob
15A. Passenger Side Upper Door Rest Adjustment Jack Screw
15B. Passenger Side Upper Door Rest Adjustment Jack Screw Nut
16. Vehicle Door Lift/Storage/Re-Installation Device, 2-Door System
17. Vehicle Door Lift/Storage/Re-Installation Device, 4-Door System
18. Driver, Front Lift/Storage/Re-Installation Device, 4-Door System
19. Passenger, Front Lift/Storage/Re-Installation Device, 4-Door System
20. Passenger, Rear Lift/Storage/Re-Installation Device, 4-Door System
21. Driver, Rear Lift/Storage/Re-Installation Device, 4-Door System
22. Painted Door Face, Passenger, Front
22A. Passenger, Front Door
22B. Driver, Front Door
22C. Passenger, Rear Door
22D. Driver, Rear Door
23. 2-Door Vehicle
24. Door Interior Side, Passenger, Front
25. Gap Below Door, BEFORE Vertical Adjustment
26. Gap Below Door (Larger than 25), Before Vertical/Tilt Adjustment
27. Lower Door Edge, Passenger, Front
28. Gap Below Door Edge 27, AFTER Vertical Adjustment
29. Gap Below Door Edge 27, (Larger than 28), Before Tilt Adjustment
30. Gap Below Door Edge 27, AFTER Tilt Adjustment
31. Gap Between Painted Door Face 22 & Upper Door Rest Protective Felt Strip 9A, BEFORE Adjustment
32. Gap Between Painted Door Face 22 & Upper Door Rest Protective Felt Strip 9A, AFTER Adjustment
33. Upper Hinge Pin, Passenger, Front Door
33A. Upper Hinge Pin, Driver, Front Door
34. Lower Hinge Pin, Passenger, Front Door
34A. Lower Hinge Pin, Driver, Front Door
35. Upper Hinge Mount, Passenger, Front
35A. Upper Hinge Mount, Driver, Front
36. Lower Hinge Mount, Passenger, Front
36A, Lower Hinge Mount, Driver, Front
37. Painted Door Face, Driver, Front
38. Optional Cover, 2-Door
39. Crack/Deviation in Parking Surface
40. Lower Parking Surface
41. Higher Parking Surface 42. Misaligned Upper Hinge Pin to Hinge Mount, Passenger, Front
43. Outer, Lower Door Edge, Passenger, Front
44. Aligned Upper Hinge Pin to Hinge Mount, Passenger, Front
45. Passenger, Front Door Hinge Pins, Fully Seated, Door Re-Installed
46. 4-Door Vehicle
47. Passenger, Front Door Hinge Pins Lifted from Hinge Mounts
48. Passenger, Rear Door Hinge Pins Lifted from Hinge Mounts
49. Driver, Front Door Hinge Pins Lifted from Hinge Mounts
50. Driver, Rear Door Hinge Pins Lifted from Hinge Mounts
60. Vertical Frame Structure
61. Central Frame Section
62. First Side Frame Section
63. Second Side Frame Section
64.
65.
66. Vertical Member
67. Upper Horizontal Member
68. Pinned Attachment
69.
100. Vehicle Door Storage System

The invention claimed is:

1. A vehicle door storage system comprising:
   (a) a base having at least four swivel casters;
   (b) a vertical frame structure extending upward from the base, the vertical frame structure including (i) a first side, (ii) a second side opposing the first side, and (iii) a vertical axis extending upward from the base;
   (c) a door carrier slidingly mounted on each of the first side and second side of the vertical frame structure, each door carrier including a lower door rest, wherein the lower door rest has a first threaded member causing it to rotate with respect to the respective door carrier;
   (d) a second threaded member engaging at least one of the first or second sides and causing the first or second side to translate toward and away from the vertical axis; and
   (e) a third threaded member engaging the vertical frame structure and each door carrier, respectively, thereby causing the door carriers to slide in along the first and second sides of the vertical frame structure.

2. The storage system of claim 1, wherein each door carrier includes a lower frame member, an upper frame member, and two vertical frame members, and the first threaded member rotates in the lower frame member in order to rotate the lower door rest.

3. The storage system of claim 1, wherein a separate second threaded member engages the other of the first or second side.

4. The storage system of claim 1, wherein the second threaded member allows the first or second side to translate at least three inches from the vertical axis at a height of the second threaded member.

5. The storage system of claim 2, wherein the first threaded member allows the lower door rest to rotate at least 5° from the lower frame member.

6. The storage system of claim 1, wherein the first side and second side of the vertical frame structure each include at least two frame members which are pinned to the base.

7. The storage system of claim 1, wherein the first side and second side of the vertical frame have slots engaged by the door carriers.

8. The storage system of claim 1, wherein the vertical frame includes (i) a central frame section extending upwardly substantially vertically from the base and (ii) the first side and second side each are formed of a side frame section tilting inward toward the central frame section as the side frame sections extend upward.

9. The storage system of claim 8, wherein a bottom of the side frame sections are pinned to the base.

10. The storage system of claim 8, wherein a bottom of the central frame section connects to the base approximately equal-distant from a first side pair of casters and a second side pair of casters.

11. The storage system of claim 1, wherein the vertical frame attaches to the base at a point below a top of all the casters.

12. A vehicle door storage system comprising:
    (a) a base having at least four casters;
    (b) a vertical frame structure extending upward from the base, the vertical frame structure including (i) a first side, (ii) a second side opposing the first side, and (iii) a vertical axis extending upward from the base;
    (c) a door carrier slidingly mounted on each of the first side and second side of the vertical frame structure, each door carrier including a lower door rest, wherein the lower door rest is configured to rotate with respect to the respective door carrier; and
    (d) wherein the first side and the second side are configured to rotate with respect to the base.

13. The storage system of claim 12, wherein (i) the lower door rest rotates based upon a threaded member engaging the lower door rest and door carrier, and (ii) the first and second sides rotates based upon a threaded member engaging an upper horizontal frame member of the first and second sides, respectively.

14. The storage system of claim 13, wherein the door carrier moves along the vertical frame structure based on a threaded member engaging both the upper horizontal frame member and door carrier, respectively.

15. The storage system of claim 12, wherein the first side and second side of the vertical frame have slots engaged by the door carriers.

16. The storage system of claim 12, wherein the vertical frame includes (i) a central frame section extending upwardly substantially vertically from the base and (ii) the first side and second side each are formed of a side frame section tilting inward toward the central frame section as the side frame sections extend upward.

17. The storage system of claim 16, wherein a bottom of the side frame sections are pinned to the base.

18. The storage system of claim 12, wherein a bottom of the central frame section connects to the base approximately equal-distant from a first side pair of casters and a second side pair of casters.

19. The storage system of claim 12, wherein the vertical frame attaches to the base at a point below a top of all the casters.

* * * * *